United States Patent
Liang et al.

(10) Patent No.: US 9,533,472 B2
(45) Date of Patent: Jan. 3, 2017

(54) PEELABLE SEALANT CONTAINING THERMOPLASTIC COMPOSITE BLENDS FOR PACKAGING APPLICATIONS

(75) Inventors: Ying Liang, Vernon Hills, IL (US); Panagiotis Kinigakis, Roscoe, IL (US); Francis J. Rossi, Chicago, IL (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 149 days.

(21) Appl. No.: 13/449,762

(22) Filed: Apr. 18, 2012

(65) Prior Publication Data
US 2012/0207997 A1 Aug. 16, 2012

Related U.S. Application Data

(63) Continuation-in-part of application No. 12/983,732, filed on Jan. 3, 2011, now Pat. No. 8,993,080.

(51) Int. Cl.
*B29D 22/00* (2006.01)
*B32B 27/08* (2006.01)
(Continued)

(52) U.S. Cl.
CPC .......... *B32B 27/08* (2013.01); *B32B 7/06* (2013.01); *B32B 15/08* (2013.01); *B32B 27/10* (2013.01);
(Continued)

(58) Field of Classification Search
CPC ............ B32B 7/06; B32B 15/08; B32B 27/08; B32B 27/10; B32B 27/18; B32B 27/32; B32B 27/36; B32B 2307/31; B32B 2307/518; B32B 2439/00; B32B 2439/70; B32B 2307/302; B32B 2264/104; B32B 2264/10
(Continued)

(56) References Cited

U.S. PATENT DOCUMENTS 3,616,898 A 11/1971 Massie
3,879,492 A 4/1975 Bontinick
(Continued)

FOREIGN PATENT DOCUMENTS

DE 4410235 9/1995
EP 0684970 12/1995
(Continued)

OTHER PUBLICATIONS

Tolinski, Michael. Additives for Polyolefins Getting the Most Out of Polypropylene, Polyethylene and TPO. Oxford: William Andrew Pub (2009).*
(Continued)

*Primary Examiner* — James Yager
(74) *Attorney, Agent, or Firm* — Fitch, Even, Tabin & Flannery LLP

(57) ABSTRACT

A packaging system has a peelable seal section which includes a first sealing layer and a second sealing layer such that the first sealing layer contacts the second sealing layer to form a peelable seal. The first sealing layer includes thermoplastic polymer or a blend of thermoplastic polymers, an organoclay dispersed within the thermoplastic polymer, a first additional inorganic additive component dispersed within the thermoplastic polymer and a second additional inorganic additive component dispersed within the thermoplastic polymer. The first additional additive component and/or the second additional additive component is selected from the group consisting of calcium carbonate, hydrated magnesium silicate (talc), magnesium carbonate, titanium oxide, magnesium oxide, magnesium sulfate, barium sulfate, barium aluminates, barium borate, barium silicate and combinations thereof.

33 Claims, 25 Drawing Sheets

(51) Int. Cl.
*B32B 7/06* (2006.01)
*B32B 15/08* (2006.01)
*B32B 27/10* (2006.01)
*B32B 27/18* (2006.01)
*B32B 27/32* (2006.01)
*B32B 27/36* (2006.01)

(52) U.S. Cl.
CPC .............. *B32B 27/18* (2013.01); *B32B 27/32* (2013.01); *B32B 27/36* (2013.01); *B32B 2264/10* (2013.01); *B32B 2264/104* (2013.01); *B32B 2307/302* (2013.01); *B32B 2307/31* (2013.01); *B32B 2307/518* (2013.01); *B32B 2439/00* (2013.01); *B32B 2439/70* (2013.01)

(58) Field of Classification Search
USPC ....................................................... 428/35.7
See application file for complete search history.

(56) References Cited

U.S. PATENT DOCUMENTS

| | | |
|---|---|---|
| 3,885,977 A | 5/1975 | Lachman |
| 4,058,645 A | 11/1977 | Steiner |
| 4,361,237 A | 11/1982 | Heiremans |
| 4,367,312 A | 1/1983 | Bontinck |
| 4,488,647 A | 12/1984 | Davis |
| 4,512,479 A | 4/1985 | Hain |
| 4,533,509 A | 8/1985 | Gust |
| 4,623,398 A | 11/1986 | Goodman |
| 4,752,342 A | 6/1988 | Tatum |
| 4,771,935 A | 9/1988 | Hekal |
| 4,810,541 A | 3/1989 | Newman |
| 4,970,113 A | 11/1990 | Yamada |
| 5,145,737 A | 9/1992 | Boiron |
| 5,334,643 A | 8/1994 | Gage |
| 5,385,776 A | 1/1995 | Maxfield |
| 5,392,986 A | 2/1995 | Beer |
| 5,437,911 A | 8/1995 | Rohrka |
| 5,449,552 A | 9/1995 | Bochow |
| 5,527,576 A | 6/1996 | Maul |
| 5,626,929 A | 5/1997 | Stevenson |
| 5,634,969 A | 6/1997 | Cody |
| 5,716,698 A | 2/1998 | Schreck |
| 5,739,087 A | 4/1998 | Dennis |
| 5,747,560 A | 5/1998 | Christiani et al. |
| 5,773,136 A | 6/1998 | Alder |
| 5,780,376 A | 7/1998 | Gonzales et al. |
| 5,830,547 A | 11/1998 | MacKenzie |
| 5,912,084 A | 6/1999 | Hausmann |
| 5,958,531 A | 9/1999 | Stevenson |
| 5,997,968 A | 12/1999 | Dries |
| 6,006,913 A | 12/1999 | Ludemann |
| 6,034,163 A | 3/2000 | Barbee et al. |
| 6,036,765 A | 3/2000 | Farrow |
| 6,355,732 B1 | 3/2002 | Beer |
| 6,358,622 B1 | 3/2002 | Shida |
| 6,359,052 B1 | 3/2002 | Trexler |
| 6,384,121 B1 | 5/2002 | Barbee |
| 6,417,262 B1 | 7/2002 | Turner |
| 6,423,768 B1 | 7/2002 | Khouri |
| 6,444,742 B1 | 9/2002 | Rong |
| 6,451,426 B2 | 9/2002 | Kong |
| 6,465,543 B1 | 10/2002 | Alexandre |
| 6,521,678 B1 | 2/2003 | Chaiko |
| 6,521,690 B1 | 2/2003 | Ross |
| 6,548,587 B1 | 4/2003 | Bagrodia |
| 6,552,114 B2 | 4/2003 | Turner |
| 6,599,622 B1 | 7/2003 | Chu |
| 6,642,296 B2 | 11/2003 | Fisher |
| 6,709,759 B2 | 3/2004 | Mueller |
| 6,713,152 B2 | 3/2004 | Chen et al. |
| 6,723,403 B2 | 4/2004 | Ishii |
| 6,767,951 B2 | 7/2004 | Nair |
| 6,770,697 B2 | 8/2004 | Drewniak et al. |
| 6,815,025 B2 | 11/2004 | Kawamura |
| 6,838,508 B2 | 1/2005 | Hsiao |
| 6,849,313 B2 | 2/2005 | Mechelaere |
| 6,896,956 B2 | 5/2005 | Kong |
| 6,913,809 B2 | 7/2005 | Wolak |
| 7,135,508 B2 | 11/2006 | Chaiko |
| 7,141,293 B2 | 11/2006 | Peiffer |
| 7,157,516 B2 | 1/2007 | Chaiko |
| 7,166,656 B2 | 1/2007 | Majumdar |
| 7,186,452 B2 | 3/2007 | Peiffer |
| 7,205,040 B2 | 4/2007 | Peiffer |
| 7,211,306 B2 | 5/2007 | Peiffer |
| 7,267,858 B2 | 9/2007 | Ono |
| 7,329,453 B2 | 2/2008 | Peiffer |
| 7,354,635 B2 | 4/2008 | Malfait |
| 7,368,165 B2 | 5/2008 | Sankey |
| 7,368,496 B2 | 5/2008 | Kim |
| 7,371,793 B2 | 5/2008 | Gong |
| 7,393,581 B2 | 7/2008 | Kim |
| 7,396,578 B2 | 7/2008 | Peiffer |
| 7,413,800 B2 | 8/2008 | Wood |
| 7,638,573 B2 | 12/2009 | Wang et al. |
| 7,645,829 B2 | 1/2010 | Tse et al. |
| 7,695,809 B1 | 4/2010 | Maksymkiw et al. |
| 7,871,696 B2 | 1/2011 | Kinigakis |
| 7,871,697 B2 | 1/2011 | Kinigakis |
| 7,928,154 B2 | 4/2011 | Chan |
| 8,110,286 B2 | 2/2012 | Kinigakis |
| 8,470,397 B2 | 6/2013 | Kinigakis |
| 2001/0012557 A1 | 8/2001 | Willham |
| 2001/0035593 A1 | 11/2001 | Peiffer |
| 2002/0009563 A1 | 1/2002 | Kawamura |
| 2002/0122977 A1 | 9/2002 | Fujimatsu |
| 2002/0137834 A1 | 9/2002 | Barbee |
| 2002/0165306 A1 | 11/2002 | Gilmer |
| 2003/0100656 A1 | 5/2003 | Majumdar |
| 2003/0129331 A1 | 7/2003 | Chen et al. |
| 2003/0144398 A1 | 7/2003 | Cody |
| 2003/0144938 A1 | 7/2003 | Lahre |
| 2003/0152735 A1 | 8/2003 | Koike |
| 2003/0219585 A1 | 11/2003 | Yamanaka |
| 2004/0024102 A1 | 2/2004 | Hayes |
| 2004/0067284 A1 | 4/2004 | Sankey |
| 2005/0037191 A1 | 2/2005 | Ikenoya |
| 2005/0042468 A1 | 2/2005 | Peiffer |
| 2005/0074619 A1 | 4/2005 | Peiffer |
| 2005/0121822 A1 | 6/2005 | Peiffer |
| 2005/0208282 A1 | 9/2005 | Wood |
| 2005/0249903 A1 | 11/2005 | Kendig et al. |
| 2005/0249906 A1 | 11/2005 | Sankey |
| 2005/0266257 A1 | 12/2005 | Lee |
| 2005/0276940 A1 | 12/2005 | Stevenson |
| 2005/0282948 A1 | 12/2005 | Li |
| 2006/0046595 A1 | 3/2006 | Imaizumi |
| 2006/0094810 A1 | 5/2006 | Kim |
| 2006/0094811 A1 | 5/2006 | Kim |
| 2006/0111499 A1 | 5/2006 | Kim |
| 2006/0121224 A1 | 6/2006 | Kim |
| 2006/0122311 A1 | 6/2006 | Kim |
| 2006/0122312 A1 | 6/2006 | Kim |
| 2006/0128867 A1 | 6/2006 | Marx |
| 2006/0141183 A1 | 6/2006 | Williamson |
| 2006/0141241 A1 | 6/2006 | Carespodi |
| 2006/0172098 A1 | 8/2006 | Stevenson |
| 2006/0199890 A1 | 9/2006 | Fasulo |
| 2006/0211804 A1 | 9/2006 | Kim |
| 2006/0222797 A1 | 10/2006 | Bekele |
| 2006/0240204 A1 | 10/2006 | Ling |
| 2006/0269707 A1 | 11/2006 | Berbert |
| 2007/0078212 A1 | 4/2007 | Kim |
| 2007/0104395 A1 | 5/2007 | Kinigakis |
| 2007/0199481 A1 | 8/2007 | Roelofs |
| 2007/0267737 A1 | 11/2007 | Chen |
| 2008/0009579 A1 | 1/2008 | Gong et al. |
| 2008/0118688 A1 | 5/2008 | Kinigakis et al. |
| 2008/0131636 A1 | 6/2008 | Kinigakis et al. |
| 2008/0152850 A1 | 6/2008 | Paterson |
| 2008/0176980 A1 | 7/2008 | Torkelson |
| 2008/0255296 A1 | 10/2008 | Gibbons |

(56) References Cited

U.S. PATENT DOCUMENTS

| | | |
|---|---|---|
| 2008/0299317 A1 | 12/2008 | Hable |
| 2009/0036580 A1 | 2/2009 | Qian |
| 2009/0209157 A1 | 8/2009 | Ferrara |
| 2009/0279813 A1 | 11/2009 | Pokusa et al. |
| 2009/0292055 A1 | 11/2009 | Jarus |
| 2010/0092793 A1 | 4/2010 | Aithani |
| 2010/0197843 A1 | 8/2010 | Sosa |
| 2014/0080958 A1 | 3/2014 | Sun |

FOREIGN PATENT DOCUMENTS

| | | |
|---|---|---|
| EP | 1080881 | 3/2001 |
| EP | 0772553 | 4/2001 |
| EP | 1344642 | 9/2003 |
| EP | 1356925 | 10/2003 |
| EP | 1144494 | 7/2004 |
| EP | 1475229 | 11/2004 |
| EP | 1496085 | 1/2005 |
| EP | 1529799 | 5/2005 |
| EP | 1591236 | 11/2005 |
| EP | 1785447 | 5/2007 |
| FR | 2769867 | 4/1999 |
| JP | 10146931 | 6/1998 |
| JP | 10259017 | 9/1998 |
| JP | 11035907 | 2/1999 |
| JP | 2000169634 | 6/2000 |
| JP | 2000198170 | 7/2000 |
| JP | 2003285873 | 10/2003 |
| JP | 2004331188 | 11/2004 |
| WO | 9742258 | 11/1997 |
| WO | 9748554 | 12/1997 |
| WO | 9952972 | 10/1999 |
| WO | 0039200 | 7/2000 |
| WO | 03011961 | 2/2003 |
| WO | 03035391 | 5/2003 |
| WO | 03040199 | 5/2003 |
| WO | 03091020 | 11/2003 |
| WO | 2004080808 | 9/2004 |
| WO | 2005040268 | 5/2005 |
| WO | 2005056644 | 6/2005 |
| WO | 2005116132 | 12/2005 |
| WO | 2006045896 | 5/2006 |
| WO | 2006058952 | 6/2006 |
| WO | 2006071833 | 7/2006 |
| WO | 2007012805 | 2/2007 |
| WO | 2007019142 | 2/2007 |
| WO | 2007090265 | 8/2007 |
| WO | 2007093798 | 8/2007 |
| WO | 2007106671 | 9/2007 |
| WO | 2007115310 | 10/2007 |
| WO | 2007121048 | 10/2007 |
| WO | 2007121049 | 10/2007 |
| WO | 2007123582 | 11/2007 |
| WO | 2007130755 | 11/2007 |
| WO | 2007146390 | 12/2007 |
| WO | 2008043750 | 4/2008 |
| WO | 2008053205 | 5/2008 |
| WO | 2008127485 | 10/2008 |

OTHER PUBLICATIONS

Yam, Kit L., Wiley Encyclopedia of Packaging Technology (3rd Edition). John Wiley & Sons (2009).*
Roussel, M.D. et al., "The Use of Calcium Carbonate in Polyolefins Offers Significant Improvement in Productivity," TAPPI 2005, 12 pgs.
Hwo, C., "Polybutylene Blends as Easy Open Seal Coats for Flexible Packaging and Lidding," Effect J. Plastic Film and Sheeting, Oct. 1987, v. 3., p. 245-260.
Non-Final Office Action mailed Aug. 30, 2013 in corresponding U.S. Appl. No. 12/983,732, filed Jan. 3, 2011, 15 pgs.
Dai, Xin et al., "Preparation and Properties of HDPE/CaCo3/OMMT Ternary Nanocomposite," Polymer Eng. and Science, Newton: May 2010, V. 50, Iss. 5; pp. 894-899.
Non-Final Office Action mailed Aug. 1, 2012 in corresponding U.S. Appl. No. 12/983,732, filed Jan. 31, 2011, 20 pgs.
Non-final Office Action mailed Apr. 23, 2014 in U.S. Appl. No. 12/983,732, filed Jan. 3, 2011, 16 pgs.
Final Office Action mailed Oct. 30, 2014 in U.S. Appl. No. 12/983,732, filed Jan. 3, 2011, 13 pgs.
Extended European Search Report for EP 07115566.7, Completed by the European Patent Office on Jan. 14, 2008, 9 Pages.
International Search Report dated Mar. 15, 2012, from corresponding International PCT/US2009033677, 6 pages.
International Search Report for PCT/US09/33677, Completed by the USPTO on Mar. 13, 2009, 3 Pages.
Nanocor, General information about Nanomer-Nanoclay, (Dec. 2004), 1 page.
Nanocor, Nanocomposites Using Special Purpose Nanomer, (Oct. 2004), 2 pages.
PolyOne, Nanoblend (TM), Concentrates MB2001 Polyethylene, www.PolyOne.com, 2003, 1 page.
PolyOne, Nanoblend (TM), Concentrates MB2101 Polyethylene, www.PolyOne.com, 2003, 1 page.
PolyOne, Nanoblend Concentrates, http://www.polyone.com/prod/trade/trade_info.asp?ID=(26511 B3B-C298-4, 2 pages.

* cited by examiner

PEELABLE SEALANT CONTAINING THERMOPLASTIC COMPOSITE BLENDS FOR PACKAGING APPLICATIONS

CROSS-REFERENCE TO RELATED APPLICATIONS

This application is a continuation-in-part of U.S. application Ser. No. 12/983,732, filed Jan. 3, 2011, the disclosure of which is incorporated in its entirety by reference herein.

TECHNICAL FIELD

The present invention relates to package systems that include a peelable seal and, in particular, the present invention relates to compositions and methods for forming such peelable seals.

BACKGROUND

Packaging is an important feature in protecting, selling and marketing most products. Packaging has broad applications, for example, in food products, medical devices, electronic components, industrial products, personal hygiene products, pet products, collectibles, jewelry, and the like. The specific features of such packaging will require properties for the particular application. For example, medical products and food products may often require a hermetic seal in order to prevent contamination of the product contained therein.

Food products, in particular, have rather stringent packaging requirements in order to preserve freshness and provide desired shelf life. Certain medical devices also demand strict packaging requirements in order to preserve sterility of such devices. In such applications, the package is typically vacuum-packed or gas-flushed and subsequently hermetically sealed. Although efficient packaging of products is mandatory, various aesthetic properties of a product package are also important. For example, the package appearance is highly important to consumer appeal. In addition, functional properties of the packaging such as reusability and ease of opening of a package are important considerations. In many of these applications, the ability to easily open a package will depend on the mechanical properties of the seal. Moreover, the ability of the sealant substrate to transfer heat at a high rate (heat/thermal conductivity) results in a significant reduction of seal dwell time, and enables higher cycle speed and lower energy consumption, of sealing processes with total material reduction (sustainability).

One such packaging structure utilizes a peelable seal. When a package having a peelable seal is opened, a sealing layer may be peeled away from a substrate. It is desirable for such peeling to be achievable with a low and relatively constant peel force. The elastic properties of the peelable seal ensure that failure of the seal does not occur from flexing and normal handling of the package. In some packaging prior art, peelable seals are constructed from multi-layered sheets. Examples of packaging systems having such seals include standup and regular pouches, bag-in-a-box, tray-type food packages, bottles or blister packages, over-wrap and the like. Although some of these peelable sealing packages work reasonably well, it has been difficult to construct suitable packaging systems that will consistently form hermetic seals that resist leaking even when wrinkles, pleats, and gussets are present, and still be easily opened by an end user. Moreover, such earlier peelable packaging systems tend to operate over relatively narrow ranges, and, in particular, narrow temperature sealing ranges. Narrow sealing temperature ranges tend to result in packaging defects. For example, on the low end of the usable temperature range, leaking seals may be formed (not hermetically sealed). On the high end of the usable temperature range, non-peelable seals are formed which tear when opened.

Accordingly, there exists a need for improved peelable packaging systems that resist leaking by providing more caulking of the film seal channels, provide a hermetic seal, and open easily and seal consistently over a broad range of sealing temperatures without loss of desired peelable seal functionality as the seal ages.

SUMMARY

The present invention solves one or more problems of the prior art by providing at least one embodiment of a packaging system having a peelable seal section. The peelable seal section includes a first sealing layer and a second sealing layer such that the first sealing layer contacts the second sealing layer to form a peelable seal. The first sealing layer includes a thermoplastic polymer, an organoclay dispersed within the thermoplastic polymer, a first additional inorganic additive component dispersed within the thermoplastic polymer, and a second additional inorganic additive component dispersed within the thermoplastic polymer. The first additional inorganic additive component is selected from the group consisting of hydrated magnesium silicate (talc), magnesium carbonate and calcium carbonate. The second additional inorganic additive component is selected from the group consisting of calcium carbonate, hydrated magnesium silicate (talc), magnesium carbonate, titanium oxide, magnesium oxide, magnesium sulfate, barium sulfate, barium aluminates, barium borate, barium silicate and combinations thereof. Characteristically, the first additional inorganic additive component is different than the second additional inorganic additive component.

In still another embodiment of the present invention, a packaging system having a peelable seal section is provided. The peelable seal section includes a sealing structure having formula 1:

$$L_1/\ldots/L_n/P \qquad (1)$$

wherein P is a first sealing layer, $L_1$ through $L_n$ are layers within a support base upon which the sealing layer is disposed, and n is an integer representing the number of layers in the support base. The peelable seal section also includes a substrate such that the first sealing layer contacts the substrate to form a peelable seal, the first sealing layer includes a thermoplastic polymer, an organoclay dispersed within the thermoplastic polymer, a first additional inorganic additive component dispersed within the thermoplastic polymer, and a second additional inorganic additive component dispersed within the thermoplastic polymer. The first additional inorganic additive component is selected from the group consisting of hydrated magnesium silicate (talc), magnesium carbonate and calcium carbonate. The second additional inorganic additive component is selected from the group consisting of calcium carbonate, hydrated magnesium silicate (talc), magnesium carbonate, titanium oxide, magnesium oxide, magnesium sulfate, barium sulfate, barium aluminates, barium borate, barium silicate and combinations thereof. Characteristically, the first additional inorganic additive component is different than the second additional inorganic additive component.

In yet another embodiment, a packaging system having a peelable seal section is provided. The peelable seal section includes a sealing structure having formula 2:

$$L_1/\ldots/L_n/P/L_f \qquad (2)$$

wherein P is a first sealing layer, $L_1$ through $L_n$ represent layers within a support base upon which the sealing layer is disposed, $L_f$ is an additional layer disposed over the first sealing layer, and n is an integer representing the number of layers in the support base. The sealing section also includes a substrate such that the first sealing layer contacts the substrate to form a peelable seal. The first sealing layer includes a thermoplastic polymer, an organoclay dispersed within the thermoplastic polymer, a first additional inorganic additive component dispersed within the thermoplastic polymer, and a second additional inorganic additive component dispersed within the thermoplastic polymer. The first additional inorganic additive component is selected from the group consisting of hydrated magnesium silicate (talc), magnesium carbonate and calcium carbonate. The second additional inorganic additive component is selected from the group consisting of calcium carbonate, hydrated magnesium silicate (talc), magnesium carbonate, titanium oxide, magnesium oxide, magnesium sulfate, barium sulfate, barium aluminates, barium borate, barium silicate and combinations thereof. Characteristically, the first additional inorganic additive component is different than the second additional inorganic additive component.

In yet another embodiment, a method of forming a packaging system is provided. The packaging system has a peelable seal section that includes a first sealing layer and a second sealing layer. The first sealing layer includes a thermoplastic polymer, an organoclay dispersed within the thermoplastic polymer, a first additional inorganic additive component carbonate dispersed within the thermoplastic polymer, and a second additional inorganic additive component carbonate dispersed within the thermoplastic polymer. The first additional inorganic additive component is selected from the group consisting of hydrated magnesium silicate (talc), magnesium carbonate and calcium carbonate. The second additional inorganic additive component is selected from the group consisting of calcium carbonate, hydrated magnesium silicate (talc), magnesium carbonate, titanium oxide, magnesium oxide, magnesium sulfate, barium sulfate, barium aluminates, barium borate, barium silicate and combinations thereof. The method comprising forming the first sealing layer and the second sealing layer, contacting the first sealing layer to the second sealing layer; and forming a peelable seal by heating the first and second sealing layer. Characteristically, the first additional inorganic additive component is different than the second additional inorganic additive component.

DETAILED DESCRIPTION

Figure 1A:
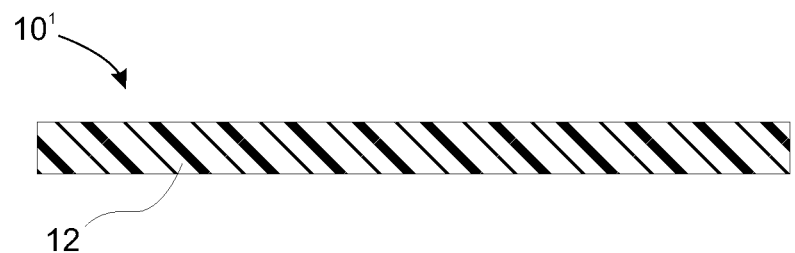
FIG. 1A is a schematic cross-section of a single layer sealing structure that contains organoclay and an inorganic filler, such as calcium carbonate additives.

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary, percent (%), "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains.

The term "organoclay" as used herein means organically modified clay. Typically, such modification renders a clay to be more compatible and, therefore, blendable with polymers.

The term "clay layer(s)", "clay sheet(s)", "clay platelet(s)" as used herein means individual layers of the layered material, such as smectite clay.

The term "exfoliated organoclay" used herein means that at least a portion of the organoclay includes a plurality of platelets in which the separation between the platelets is greater than the separation of platelets in unmodified clay and that at least a portion of the platelets are non-parallel. In typical unmodified clay, the adjacent platelets tend to be parallel. Typically, the average separation of an exfoliated organoclay will be greater than about 20 angstroms. Clays with average separations greater than about 100 nanometers are considered to be fully exfoliated. It should also be appreciated that the individual stacks of organoclay platelets may themselves be associated with other stacks to form an agglomeration of stacks. Such agglomerations are characterized by a maximum spatial dimension. From a morphology point of view, scanning electron microscope (SEM), or optical microscopy provide information on the size of the agglomerations in polymer matrix, the maximum spatial dimension is used to represent the organoclay distribution in polymer and polymer blends. A large value of the maximum spatial dimension represents good dispersion of the organoclay. The average maximum spatial dimension is from 1 nanometer to 100 microns. In refinement, the average maximum spatial dimension is from 1 nm to 100 nm. In another refinement, the average maximum spatial dimension is from 1 nm to 1000 nm. In another embodiment, the diameter is from 1 micron to 100 micron.

The term "neat polymer" or "neat polymer blend" as used herein means a thermoplastic polymer, or different types of thermoplastic polymer blends, that contain no inorganic filler.

The term "peelable seal" as used herein means a seal that has a peel force of between 0.5 lbs to 6 lbs per one inch of sample width and a force that peels open the seal. Typically, the upper limit is less than or equal to 5 lbs per inch of sample width. In other variations, the upper limit is less than or equal to 4 lbs per inch of sample width or less than the tear strength on the film substrate.

The term "peel force" as used herein means a force to separate two layers as defined in ASTM F-88, which is incorporated by reference. For example, this is the force necessary to separate two layers of one inch width by pulling the two layers apart. Sometimes, the peel force is referred to as the peel strength.

The term "seal initiation temperature" as used herein refers to the lowest temperature at which a seal is formed with a peel force of 0.5 lbs. per inch. Specifically, the seal initiation temperature is the temperature of a surface (typically metal) contacting a layer or layers that are to be sealed thereby promoting such sealing. In some variations, the surface contacts the layer(s) with a dwell time from about 0.1 to 2 seconds with a pressure from 5 psi to 1200 psi.

The term "peelable seal temperature range" as used herein means the range of temperatures at which a seal between two materials is formed such that the peel force is between 0.5 lbs per one inch of sample width to 6 lbs per one inch of sample width with a force that tears the films as set forth above.

The term "sealing temperature" as used herein means a temperature at which a seal is formed between two materials.

The terms "caulking slope" and "ultimate perfect sealing thickness" as used herein are defined as follows. A caulking test method introduces a gap with flat wire at a certain thickness (i.e., contaminant thickness) in the sealing region to simulate a contaminant inadvertently introduced near or in the sealing area during the heat seal process (see FIG. 10). The non-sealed area is measured using optical microscopy. A lower reading of the unsealed area represents better caulkability and enhanced ability to provide a hermetic seal. The non-sealed area is plotted as a function of contaminant thickness. The data is fit by linear regression (e.g., a least squares fit) with the caulking slope being the slope of the fitted line. The ultimate perfect sealing thickness is the contaminant thickness at a non-seal area of zero. A higher ultimate perfect sealing thickness indicates high caulkability.

In an embodiment of the present invention, a peelable sealing structure is provided. The peelable sealing structure provides an improvement over the structures set forth in U.S. Pat. Pub. No. 2008/0118688, the entire disclosure of which is hereby incorporated by reference. The peelable seal section includes a first sealing layer and a second sealing layer such that the first sealing layer contacts the second sealing layer to form a peelable seal. The first sealing layer includes a thermoplastic polymer or a blend of thermoplastic polymers, an organoclay dispersed within the thermoplastic polymer or thermoplastic polymer blend, a first additional inorganic additive component, and an optional second additional inorganic additive component. In a refinement, the first additional additive component and/or the second additional additive component are selected from the group consisting of calcium carbonate, hydrated magnesium silicate (talc), magnesium carbonate, titanium oxide, magnesium oxide, magnesium sulfate, barium sulfate, barium aluminates, barium borate, barium silicate and combinations thereof. In another refinement, the first additional inorganic additive component is selected from the group consisting of hydrated magnesium silicate (talc), magnesium carbonate, and calcium carbonate and the second additional inorganic additive is selected from the group consisting of calcium carbonate, hydrated magnesium silicate (talc), magnesium carbonate, titanium oxide, magnesium oxide, magnesium sulfate, barium sulfate, barium aluminates, barium borate, barium silicate and combinations thereof. Characteristically, the first additional inorganic additive component is different than the second additional inorganic additive component. In a particularly useful variation, the first additional inorganic additive component is calcium carbonate and the second additional inorganic component is talc.

The combination of the organoclay and the first additional additive component and/or the second additional additive component operate synergistically such that the first sealing layer produces a peelable seal when the first and second sealing layers are sealed together. Specifically, some embodiments of the present invention advantageously form peelable seals that peel open via the Adhesive Type A failure mechanism. (see U.S. Pat. Pub. No. 2008/0118688, which is hereby incorporated by reference). Advantageously, the present invention has discovered that a portion of the organoclay may be substituted with the first and/or second inorganic additive thereby decreasing the amount of organoclay that is necessary in forming a peelable seal. In one refinement, the peelable seals formed herein have a peel strength from 0.5 lbs per inch of sample width to 6 lbs per inch of sample width. In another refinement, the peelable seals formed herein have a peel strength from 0.5 lbs per inch of sample width to 5 lbs per inch of sample width. In another refinement, the peelable seals formed herein have a peel strength from 1.0 lb per one inch of sample width to 4.5 lbs per inch of sample width. In still another refinement, the peelable seals formed herein have a peel strength from 1.0 lb per one inch of sample width to 4.0 lbs per inch of sample width.

The peelable seals formed herein are also characterized by a seal strength as set forth in ASTM F 88. The seal strength is tested and measured at the time a seal is formed. The preferred condition is to measure the seal strength within one minute of a newly formed peelable seal being cooled to room temperature. In a refinement, the peelable seals have a seal strength from 0.5 lbs to 6 lbs. In another refinement, the peelable seals have a seal strength from 0.5 lbs to 5 lbs. In yet another refinement, the peelable seals have a seal strength from 1 lb to 3.5 lbs.

The peelable seals of the present embodiment are also characterized by the caulking slope and the ultimate perfect sealing thickness (contaminant thickness). In a refinement, the caulking slope is less than or equal to 0.0032. In a further refinement, the caulking slope is from 0.001 to 0.0032. In another refinement, the caulking slope is from 0.0026 to 0.0032. In still another refinement, the caulking slope is from 0.0025 to 0.003. In yet another refinement, the caulking slope is from 0.0027 to 0.003. Typically, the ultimate perfect sealing thickness is greater than 5 microns. In a refinement, the ultimate perfect sealing thickness is from 5 microns to 400 microns. In another refinement, the ultimate perfect sealing thickness is from 5 microns to 300 microns.

As set forth in U.S. Pat. Pub. No. 2008/0118688, organoclay is a contributing component in peelable sealant formulation. It should be pointed out that without the organoclay, the first additional additive component and/or the second additional additive component do not produce a peelable seal (e.g., calcium carbonate and talc dispersed in a thermoplastic do not produce a peelable seal). Moreover, the combination of organoclay and the first additional additive component and the second additional additive component (e.g., calcium carbonate and talc) requires less organoclay to produce a high quality peelable seal than organoclay alone. Since the organoclay is a relatively expensive component as compared to calcium carbonate and talc, the combination of organoclay and first additional additive component or the second additional additive component offers considerable cost reduction.

In another variation of the present embodiment, the combined weight of the organoclay, the first additional inorganic additive component, and the second additional inorganic additive component is from about 10 weight % to about 45 weight % of the combined weight of the thermoplastic polymer, the organoclay, the first additional inorganic additive component, and the second additional inorganic additive component. In another refinement, the amount of organoclay is from 1 to 40 weight % of the combined weight of the thermoplastic polymer, the organoclay, the first additional inorganic additive component, and the second additional inorganic additive component. In still another refinement, the amount of organoclay is from 1 to 35 weight % of the combined weight of the thermoplastic polymer, the organoclay, the first additional inorganic additive component, and the second additional inorganic additive component. In still another refinement, the amount of organoclay is from 5 to 20 weight % of the combined weight of the thermoplastic polymer, the organoclay, the first additional inorganic additive component, and the second additional inorganic additive component. In still another variation, the amount of calcium carbonate is from 1 to 35 weight % of the combined weight of the thermoplastic polymer, the organoclay, the first additional inorganic additive component, and the second additional inorganic additive component. In still another variation, the amount of calcium carbonate is from 5 to 20 weight % of the combined weight of the thermoplastic polymer, the organoclay, the first additional inorganic additive component, and the second additional inorganic additive component. In yet another variation, the amount of talc is from 1 to 35 weight % of the combined weight of the thermoplastic polymer, the organoclay, the first additional inorganic additive component, and the second additional inorganic additive component. In yet another variation, the amount of talc is from 5 to 20 weight % of the combined weight of the thermoplastic polymer, the organoclay, the first additional inorganic additive component, and the second additional inorganic additive component. In some refinements, the first additional inorganic additive component (e.g., calcium carbonate) to organic clay weight ratio ranges from 0.4 to 2.5. In other refinements, the second additional inorganic additive component (e.g., talc) to organic clay weight ratio ranges from 0.4 to 2.5. In some refinements, the combined first and second additional inorganic additive component to organic clay weight ratio ranges from 0.4 to 4.0. The first sealing layer includes a sealing surface that contacts a surface of the second sealing layer to form the peelable seal. In another refinement, the amount of thermoplastic is from about 55 weight % to about 90 weight % of the combined weight of the thermoplastic polymer, the organoclay, the first additional inorganic additive component, and the second additional inorganic additive component.

In a variation, the sealing surface is formable into a peelable seal at all temperatures within a peelable seal temperature range, that is, from a seal initiation temperature to a temperature that is at least 50° F. above the seal initiation temperature. In a refinement, the peelable seal temperature range is from a seal initiation temperature to a temperature that is at least 75° F. above the seal initiation temperature. In still another refinement, the peelable seal temperature range is from a seal initiation temperature to a temperature that is at least 100° F. above the seal initiation temperature. Typically, for packaging applications, the seal initiation temperature ranges from about 170° F. to about 420° F. In a refinement, the seal initiation temperature ranges from about 170° F. to about 350° F. In another refinement for packaging applications, the seal initiation temperature ranges from about 170° F. to about 270° F. All above temperature limits may vary with the heat resistance of the outer layers from lamination, co-extrusion, or coating. For example, when the outer layer is high density polyethylene (HDPE), the upper limit of seal temperature is about 270° F.; when the outer layer is oriented polyester, the upper temperature limit is about 420° F.

In general, the peelable sealing structures are multilayer structures that are useful for sealing applications. Such layered structures include a sealing layer that includes organoclay, the first additional inorganic additive component, and the second additional inorganic additive component. In a refinement, the first additional inorganic additive component and the second additional inorganic additive component are selected from the group consisting of calcium carbonate, magnesium carbonate, hydrated magnesium silicate (talc), titanium oxide, magnesium oxide, magnesium sulfate, barium sulfate, barium aluminates, barium borate, barium silicate and combinations thereof. In another refinement, the first additional inorganic additive component is selected from the group consisting of magnesium silicate (talc), magnesium carbonate, and calcium carbonate and the second additional inorganic additive component is selected from the group consisting of calcium carbonate, magnesium carbonate, hydrated magnesium silicate (talc), titanium oxide, magnesium oxide, magnesium sulfate, barium sulfate, barium aluminates, barium borate, barium silicate and combinations thereof. Characteristically, the first additional inorganic additive component is different than the second additional inorganic additive component. A variation of the multilayer sealing structure is described by formula 1:

$$L_1/ \ldots /L_n/P \qquad (1)$$

wherein P is the sealing layer that includes organoclay, the first additional inorganic additive component, and the second additional inorganic additive component, $L_1$ through $L_n$ represent layers within a support base upon which the sealing layer is disposed, and n is an integer representing the number of layers in the support base. The support base usually includes one or more polymeric layers (rigid or flexible) as set forth below. Typically, n is an integer from 1 to 10. Examples of such multilayer structures have the following structures $L_1/P$; $L_1/L_2/P$; $L_1/L_2/L_3/P$; $L_1/L_2/L_3/L_4/P$; $L_1/L_2/L_3/L_4/L_5/P$; $L_1/L_2/L_3/L_4/L_5/L_4/L_5/L_6/P$; and $L_1/L_2/L_3/L_4/L_5/L_4/L_5/L_6/L_7/P$. Another variation of the multilayer sealing structure is described by formula 2:

$$L_1/ \ldots /L_n/P/L_f \qquad (2)$$

wherein P is the sealing layer that includes organoclay, the first additional inorganic additive component, and the second additional inorganic additive component, $L_1$ through $L_n$ represent layers within a support base upon which the sealing layer is disposed, $L_f$ is an additional non-peelable sealant polymeric layer disposed over the opposite side of P than $L_n$, and n is an integer representing the number of layers in the support base. The support base usually includes one or more polymeric layers as set forth below. Typically, n is an integer from 1 to 10. Examples of such multilayer structures have the following structures $L_1/P/L_f$; $L_1/L_2/P/L_f$; $L_1/L_2/L_3/P/L_f$; $L_1/L_2/L_3/L_4/P/L_f$; $L_1/L_2/L_3/L_4/L_5/P/L_f$; $L_1/L_2/L_3/L_4/L_5/L_4/L_5/L_6/P/L_f$; and $L_1/L_2/L_3/L_4/L_5/L_4/L_5/L_6/L_7/P/L_f$.

The present embodiment also encompasses variations in which the sealing structure includes a single layer P.

In another embodiment, a peelable seal using the peelable sealing structures set forth above are provided. In general, these peelable seals are described by formula 3:

$$L_1/ \ldots /L_n/P*S \qquad (3)$$

wherein S is the substrate to which the sealing structure is sealed, P is the sealing layer, $L_1$ through $L_n$ represent layers within a support base upon which the sealing layer is disposed, and n is an integer representing the number of layers in the support base, and the substrate contains no organoclay, calcium carbonate, or talc. The symbol * represents that P and S are sealed together (e.g., bonded or adhered). In a more specific variation, the peelable seal is described by formula 4:

$$L_1/ \ldots /L_n/P*P'/L'_{n'}/ \ldots /L'_1 \qquad (4)$$

wherein P and P' are independently sealing layers that include an organoclay, the first additional inorganic additive component, and the second additional inorganic additive component, $L_1$ through $L_n$ represent layers within a substrate upon which the sealing layer P is disposed, $L'_1$ through $L'_n$ represent layers within a substrate upon which the sealing layer P' is disposed, n is an integer representing the number of layers in the base that underlies P, and n' is an integer representing the number of layers in the base that underlies P'. The symbol * represents that P and P' are sealed together (e.g., bonded or adhered). Typically, n and n' are each independently an integer from 1 to 10. The present embodiment also contemplates variations in which the sealing structure is a single layer where the seal is P*P. In a refinement, the packaging system includes a container section attached to the sealing section that includes the peelable seal. It should be appreciated that the present sealing sections are designed to separate at the P*P seal. In a refinement, such separation is via a delamination mechanism.

In another embodiment, a peelable seal using the peelable sealing structures set forth above are provided. In general, these peelable seals are described by formula 5:

$$L_1/ \ldots /L_n/P/L_f*S \quad (5)$$

wherein S is the substrate to which the sealing structure is sealed, P is the sealing layer, $L_1$ through $L_n$ represent layers within a support base upon which the sealing layer is disposed, $L_f$ is an additional layer disposed over the first sealing layer, and n is an integer representing the number of layers in the support base. The symbol * represents that P and S are sealed together (e.g, bonded or adhered). Substrate S includes any material to which the multilayer structure $L_1/ \ldots /L_n/P/L_f$ can adhere to. Examples of suitable substrates include, but are not limited to, a multilayer structure (i.e., of an analogous construction as provided by formula 1 or of a different design), plastics, and metals. In another more specific variation, the peelable seal is described by formula 6:

$$L_1/\ldots/L_n/P/L_f*P'/L'_f/L'_{n'}/\ldots/L'_1 \quad (6)$$

wherein P and P' are independently sealing layers that include an organoclay, the first additional inorganic additive component, and the second additional inorganic additive component, $L_1$ through $L_n$ represent layers within a substrate upon which the sealing layer P is disposed, $L'_1$ through $L'_n$ represent layers within a substrate upon which the sealing layer P' is disposed, $L_f$ is an additional layer disposed over the sealing layer P, $L'_f$ is an additional layer disposed over sealing layer P', n is an integer representing the number of layers in the base that underlies P, and n' is an integer representing the number of layers in the base that underlies P'. Typically, n and n' are each independently an integer from 1 to 10. In a refinement, the packaging system includes a container section attached to the sealing section that includes the peelable seal. The symbol * represents that P and $L'_f$ are sealed together (e.g., bonded or adhered). It should be appreciated that the present sealing sections are designed to separate at the P*P seal. In a refinement, such separation is via a delamination mechanism.

In a variation of the sealing structures described by formulae 1-6, the total thickness of the multilayer structure is from about 5 to about 78 microns. In a refinement, the total thickness of the multilayer structure is from about 15 to about 75 microns. In another refinement, the total thickness of the multilayer structure is from about 35 to about 75 microns. In another variation of the multilayer structures set forth by formulae 1-6, the sealing layer typically has a thickness from about 2.5 to about 130 microns. In a refinement, the sealing layer has a thickness from about 5 to about 50 microns.

Figure 1B:
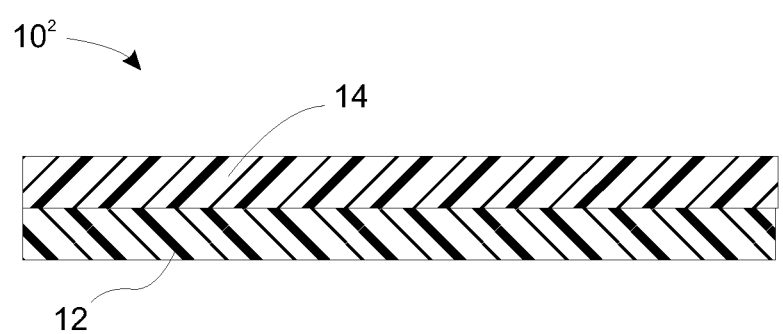
FIG. 1B is a schematic cross-section of a two layer structure with an exterior organoclay/additional additive sealing layer.
Figure 1C:
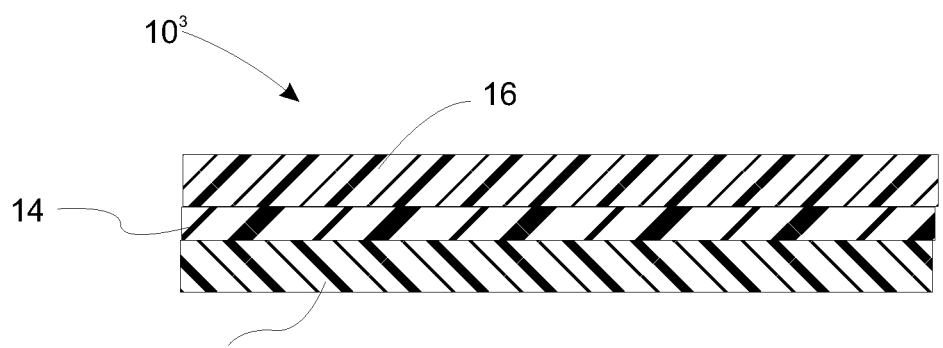
FIG. 1C is a schematic cross-section of a three layer structure with an exterior organoclay/additional additive sealing layer.
Figure 1D:
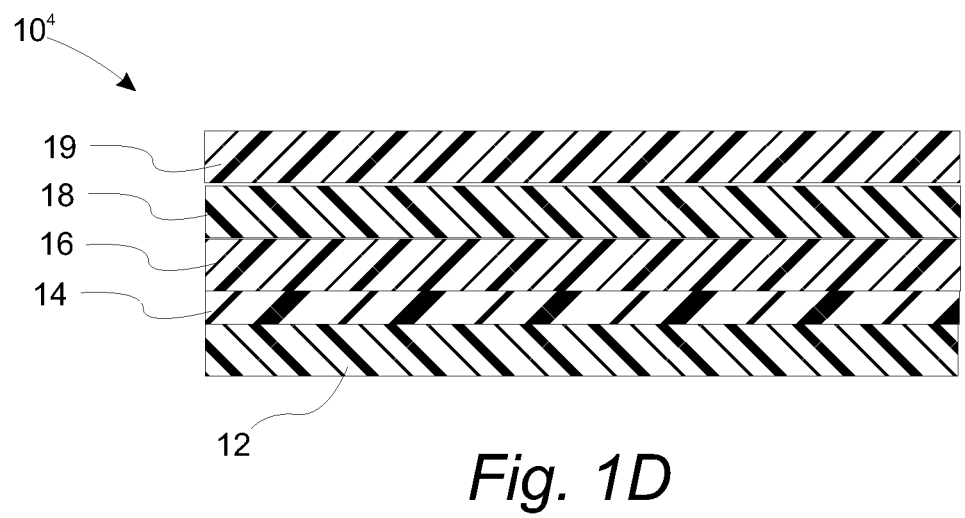
FIG. 1D is a schematic cross-section of a five layer structure with an exterior organoclay/additional additive sealing layer.
Figure 1E:
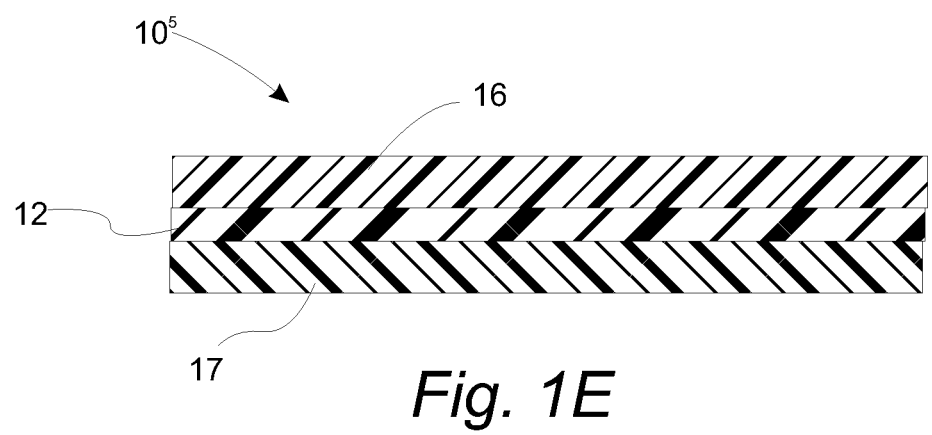
FIG. 1E is a schematic cross-section of a three layer structure with an internal organoclay/additional additive sealing layer.

With reference to FIGS. 1A, 1B, 1C, 1D, and 1E, illustrations of peelable sealing structures used in the packaging systems of the present invention are provided. The multilayer structure can be constructed by co-extrusion blown film techniques, cast film techniques, cast molding, blow molding, adhesive lamination, extrusion, lamination, extrusion lamination, extrusion coating, simultaneous film stretching, surface printing or surface coating process, or combinations thereof. In this embodiment, the peelable sealing structure is attached to a substrate to form a peelable seal or sealing section. FIG. 1A is a schematic cross-section of a single layer sealing structure. In this variation, peelable sealing structure $10^1$ includes sealing layer 12. FIG. 1B is a schematic cross-section of a two layer sealing structure consistent with formula 1. Peelable sealing structure $10^2$ includes sealing layer 12 and additional layer 14. FIG. 1C is a schematic cross-section of a three layer sealing structure consistent with formula 1. In this variation, peelable sealing structure $10^3$ includes sealing layer 12 and additional layers 14, 16. FIG. 1D is a schematic cross-section of a five layer sealing structure consistent with formula 1. In this variation, peelable sealing structure $10^4$ includes sealing layer 12 and additional layers 14, 16, 18, 19. FIG. 1E is a schematic cross-section of a three layer sealing structure consistent with the sealing structures of formula 2. In this variation, peelable sealing structure $10^4$ includes sealing layer 12 disposed between additional layers 14, 17. Either layer 14 or 17 is a non-peelable sealant layer that is able to seal to itself or seal to a substrate. Sealing layer 12 enables delamination upon opening. The generalization to sealing structures with additional layers as set forth in formulae 1-6 is straightforward. It should be appreciated that in each of the variations of FIGS. 1A, 1B 1C, 1D, and 1E, sealing layer 12 comprises a thermoplastic polymer, an organoclay dispersed within the thermoplastic film, the first additional inorganic additive component dispersed within the thermoplastic polymer, and the second additional inorganic additive component (e.g., calcium carbonate, magnesium carbonate, titanium oxide, talc, barium silicate) dispersed within the thermoplastic polymer. Sealing layer 12 is adapted to contact a substrate section of a container to form a peelable seal. Such containers may be of virtually any shape that is useful to package an object. Examples of such shapes include, but are not limited to, blisters, trays, bags, pouches, and combinations thereof.

The sealing layers formed from the composition set forth above have improved and uniform peel performance when incorporated into a seal as described more completely below. Sealed interfaces utilizing peelable sealing structure $10^1$, $10^2$, $10^3$, $10^4$, and $10^5$ (collectively, peelable sealing structures 10) peel in a consistent pattern. The hermetic integrity of the seal is not compromised even when the film specimens include wrinkles, pleats and gusset configurations in various bag/pouch package styles, through vertical form fill and seal (VFFS), horizontal form fill and seal (HFFS), and flow wrap process. Peelable sealing structure 10 exhibits a consistent peelable behavior in the following combinations: 1) sealing layer 12 contacting another sealing layer of analogous or the same composition; 2) sealing layer 12 contacting a structure formed from neat sealant (e.g. organoclay-calcium carbonate-talc/polyethylene and/or polyethylene copolymer layer against a neat polypropylene layer, organoclay-calcium carbonate-talc/polyethylene layer against neat polyester layer, organoclay-calcium carbonate-talc/polyethylene layer against a neat polyethylene layer). Processing aids such as antiblocking agents, antioxidants, slip additives, heat stabilizers, plasticizers, ultraviolet ray absorbers, anti-static agents, dyes, pigments, processing aids, release agents and the like are optionally included into the sealing layers and do not affect the peel pattern of sealing structure 10.

Additional layers 14, 16, 18, 19, 20, 21, 22 and 23 (i.e, layers $L_1$-$L_{10}$ and $L_f$) are used to provide a number of useful features to the present embodiment. For example, additional layers 14, 16 and 18 may provide structural support, heat resistance, barrier properties, and improved appearance to packaging systems that incorporate peelable sealing sections. It should also be appreciated that the present embodiment encompasses, in addition to single layer peelable sealing structures, multilayer structures having any number of additional layers in the form including lamination, co-extrusion or coated structure. In each variation of the present embodiment, the multilayer sealing structures include peelable seals having the compositions described herein.

Figure 2A:
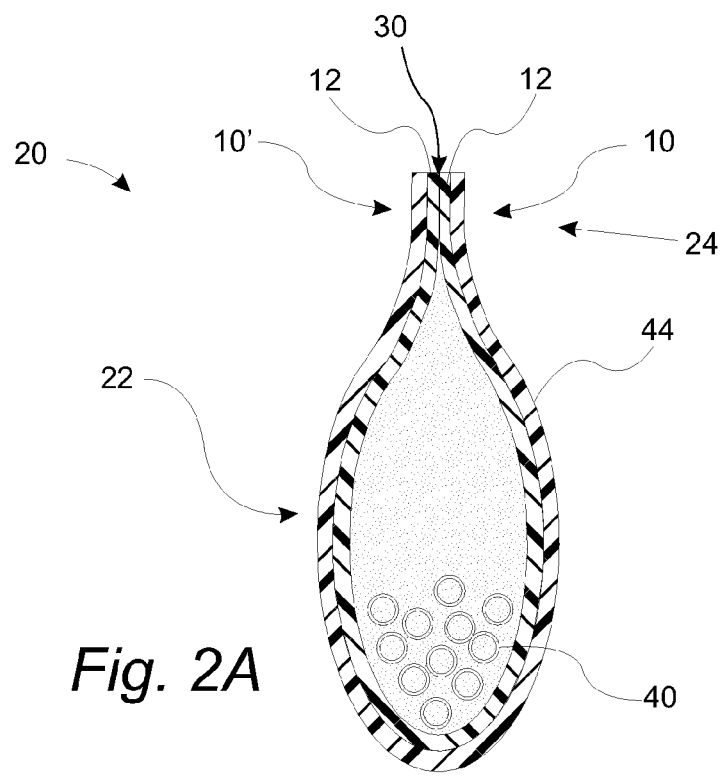
FIG. 2A is a schematic cross-section of a pouch-like packaging system incorporating an embodiment of the peelable sealing structure of the invention.
Figure 2B:
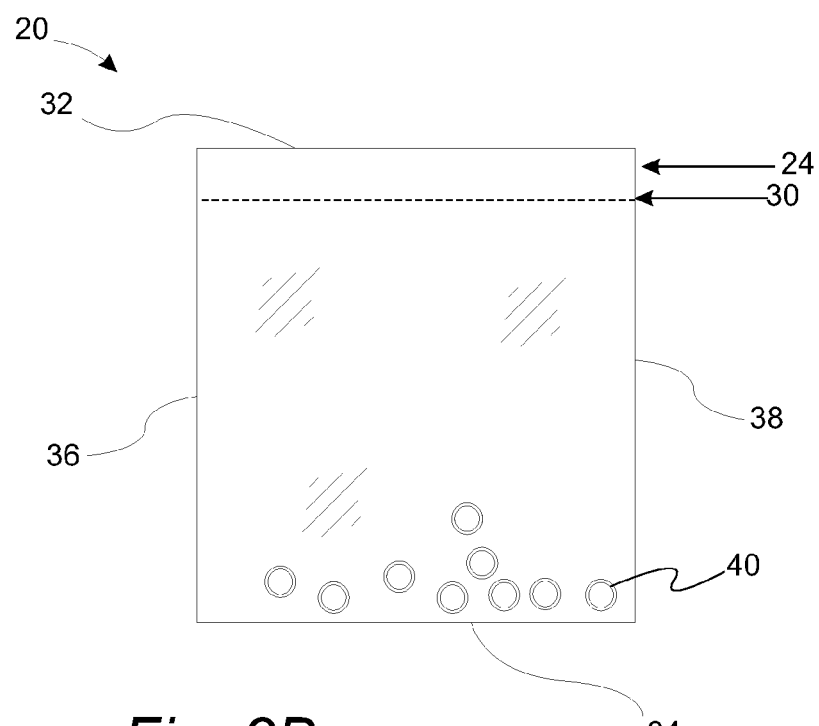
FIG. 2B is a side view of the pouch-like packaging system of FIG. 2A.
Figure 2C:
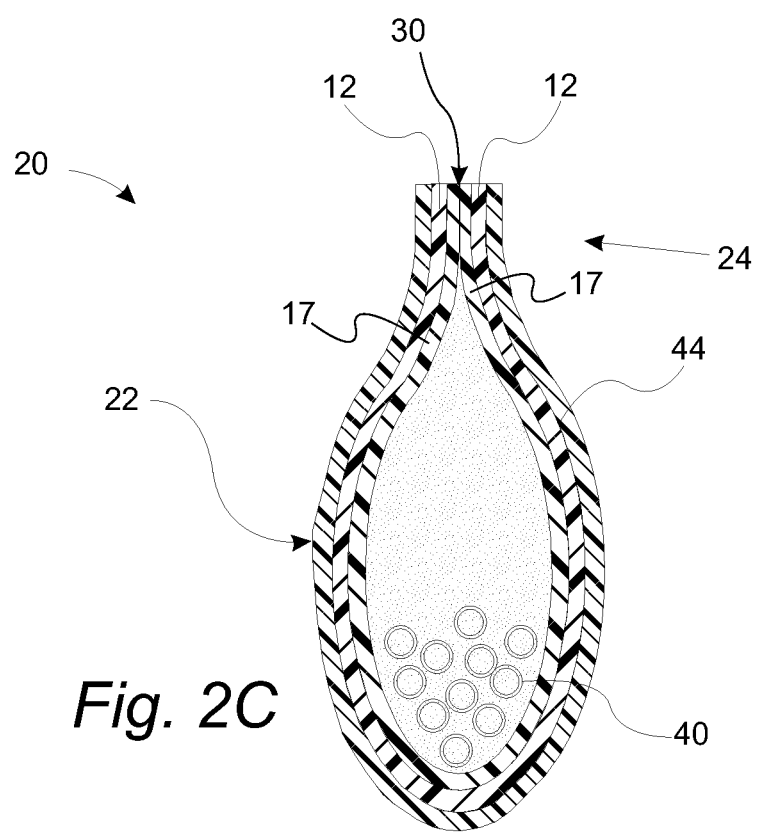
FIG. 2C is a side view of the pouch-like packaging system of FIG. 1E.

With reference to FIGS. 2A, 2B, and 2C, packaging systems incorporating the peelable sealing structures set forth in formulae 1-6 are described. FIG. 2A is a cross-section of a pouch-like packaging system incorporating an embodiment of the peelable sealing structure of the invention. FIG. 2B is a side view of a pouch-like packaging system incorporating an embodiment of the peelable sealing structure of the invention. Packaging system 20 includes container section 22 and peelable sealing section 24. Peelable sealing section 24 is attached to container section 22. FIG. 2A depicts an example in which peelable sealing section 24 and container section 22 are continuous, each being formed from the same multilayer structure (i.e., sheet). Container section 22 can have virtually any shape that is useful for packaging an object in a pouch, such as a pillow flow wrap, four-sided seal or gusseted pouch. Sealing section 24 includes peelable sealing structure 10. In the variation depicted in FIG. 2A, peelable sealing structure 10 includes sealing layer 12 disposed on additional layer 14. As set forth above in connection with the descriptions of FIGS. 1A, 1B, and 1C, sealing layer 12 comprises a thermoplastic polymer with organoclay, the first additional inorganic additive component, and the second additional inorganic additive component dispersed within the thermoplastic polymer.

Still referring to FIGS. 2A and 2B, packaging system 20 further includes a second sealing structure 10' contacting peelable sealing structure 10 to form peelable seal 30. Seal 30 seals an opening at top side 32 of packaging system 20. Similar peelable seals are optionally positioned at bottom side 34, left side 36, and right side 38. Peelable sealing structure 10' also includes sealing layer 12 disposed on additional layer(s) 14. Specifically, a first portion of the combination of sealing layer 12 disposed on additional layer(s) 14 forms sealing structure 10 while a second portion of the combination of sealing layer 12 disposed on additional layer 44 forms sealing structure 10'. Sealing structures 10, 10' are continuous with container section 22. In a variation of the present embodiment, a third portion of the combination of sealing layer 12 disposed on additional layer(s) 14 at least partially forms container section 22. Advantageously, packaging system 20 is adapted to contain object(s) 40 (i.e., may be one or more objects). Examples of object(s) 40 that may be packaged include, but are not limited to, food products and sterilized objects (e.g., medical devices and non-food products, such as personal hygiene, diaper liners, pet products, etc.).

Referring to FIG. 2C, a packaging system incorporating the peelable sealing structure of formulae 5 and 6 is provided. FIG. 2C is a cross section of such a packaging system. Packaging system 20 includes container section 22 and peelable sealing section 24. Peelable sealing section 24 is attached to container section 22. FIG. 2C depicts an example in which peelable sealing section 24 and container section 22 are continuous, each being formed from the same multilayer structure (i.e., sheet). Container section 22 can have virtually any shape that is useful for packaging an object in a pouch, such as pillow flow wrap, four-sided seal or gusseted pouch. Sealing section 24 includes peelable sealing structure 10 in which sealing layer 12 is interposed between layers 17 and 44.

Figure 3A:
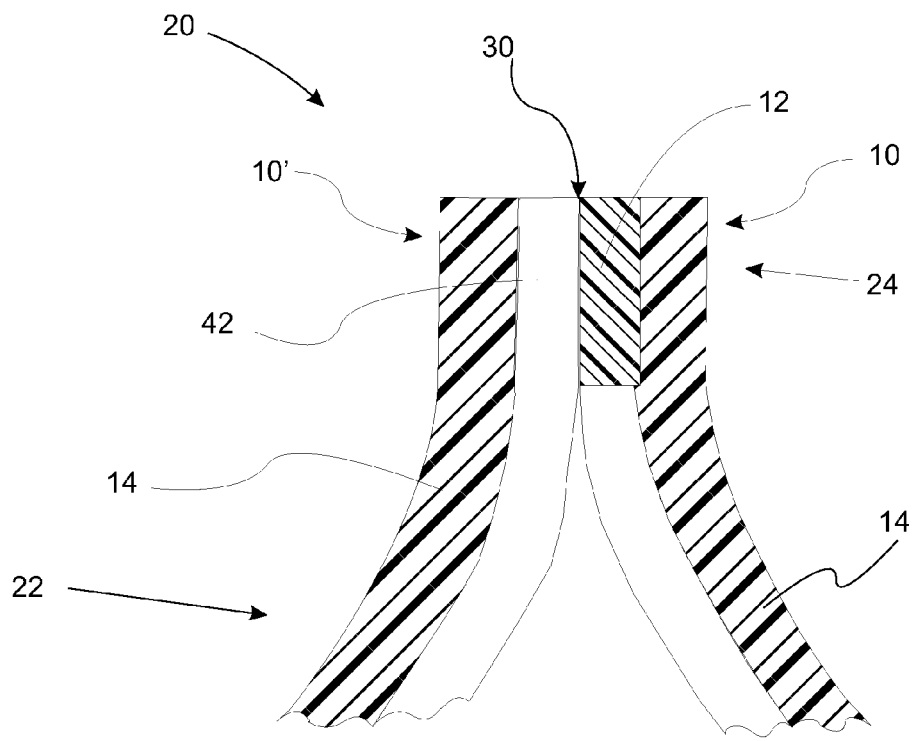
FIG. 3A is a schematic cross-section of a refinement in which a sealing substrate includes a second sealing layer.
Figure 3B:
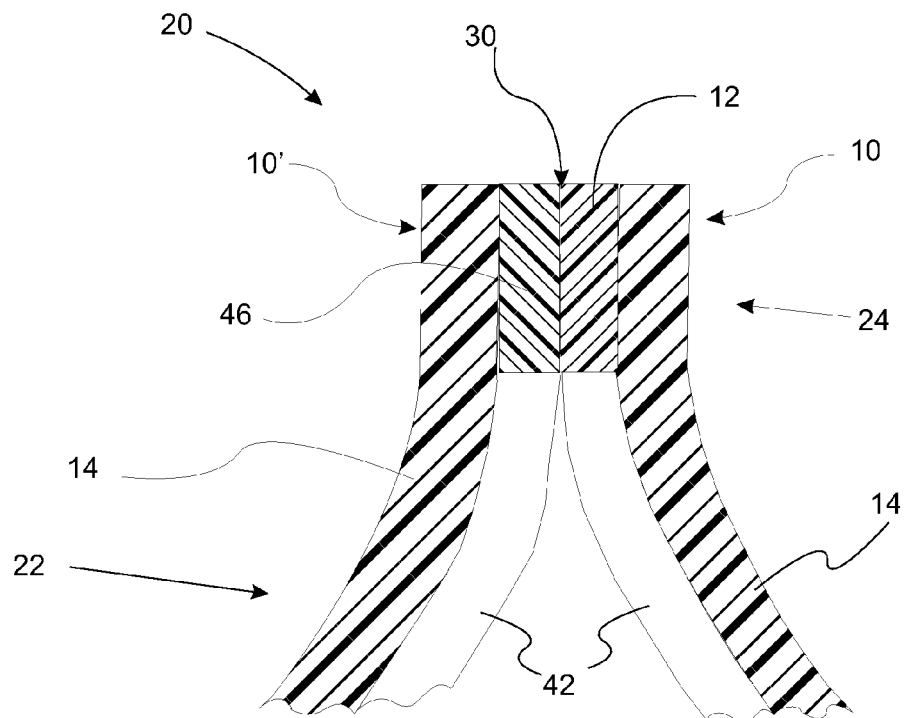
FIG. 3B is a schematic cross-section of a refinement in which a sealing substrate includes a second sealing layer with a peelable seal being formed between a first sealing layer and a second sealing layer.

With reference to FIGS. 3A and 3B, variations of peelable sealing section 24 as used in pouch-like packaging systems are illustrated. FIG. 3A is a schematic cross-section of a refinement in which sealing layer 12 is substantially confined to the vicinity of peelable sealing section 24. This variation is achieved by either confining the incorporation of organoclay or by depositing a distinct layer in the vicinity of sealing structure 24. This variation further includes inner layer 42 and one or more additional polymer layer(s) 14. FIG. 3B is a schematic cross-section of a refinement in which packaging system 20 includes second sealing layer 46 with peelable seal 30 being formed between first sealing layers 12 and second sealing layer 46. In this latter refinement, sealing layer 12 extends minimally, if at all, into container section 22. Moreover, in this refinement, container section 22 optionally includes liner layer 42 which is different than first sealing layer 12. In a further refinement of this variation, sealing section 24 further includes one or more additional polymer layer(s) 14 disposed over first sealing layer 12 and/or second sealing layer 46. In a particularly useful example of this refinement, one or more additional polymer layer(s) 14 at least partially form container section 22.

Figure 4A:
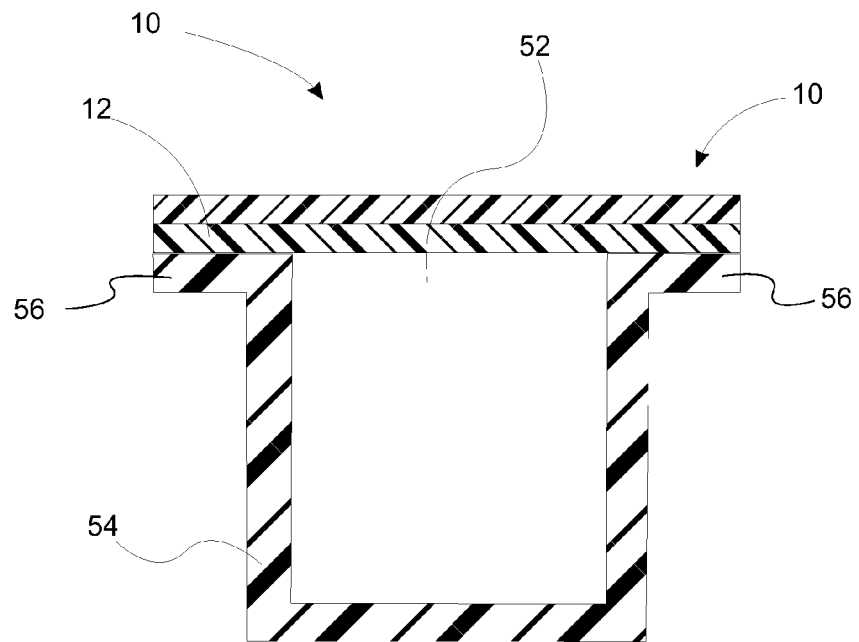
FIG. 4A is a schematic cross-section of a cup-like packaging system that uses the peelable sealing structures of the invention.
Figure 4B:
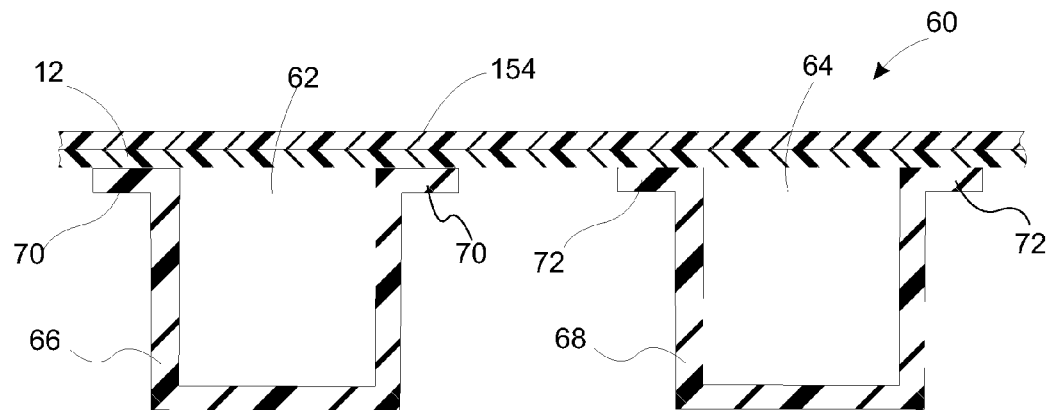
FIG. 4B is a schematic cross-section of a blister packaging system that uses the peelable sealing structures of the invention and incorporates multiple cup-like containers.

With reference to FIGS. 4A and 4B, variations of packaging systems using the peelable sealing structures of the invention with rigid container sections are illustrated. FIG. 4A provides a schematic cross-section of a cup-like packaging system that uses the peelable sealing structures of the invention. Packaging system 50 includes peelable sealing structure 10 and sealing opening 52 of container section 54. A peripheral portion of peelable sealing structure 10 is disposed over and contacts substrate section 56 of container section 54. FIG. 4B provides a schematic cross-section of a blister packaging system that incorporates multiple cup-like containers. Blister packaging system 60 includes peelable sealing structure 12 and sealing openings 62, 64 of container sections 66, 68. A portion of peelable sealing structure 12 is disposed over and contacts substrate sections 70, 72 of container sections 66, 68.

The peelable sealing layer 12 of the various embodiments of the invention includes an inorganic additive such as calcium carbonate and talc. The calcium carbonate and talc each independently comprise a plurality of particles. In a refinement, the calcium carbonate particles have an average diameter of 0.1 microns to 20 microns. In another refinement, the calcium carbonate particles have an average diameter of 0.5 microns to 10 microns. In yet another refinement, the calcium carbonate particles have an average diameter of 0.7 microns to 3 microns. The calcium carbonate can be natural calcium carbonate, calcium carbonate activated with a surface treatment (e.g. a stearic acid coating), or a precipitate calcium carbonate. In a refinement, the talc particles have an average diameter of 0.1 microns to 20 microns. In another refinement, the talc particles have an average diameter of 0.5 microns to 10 microns. In yet another refinement, the talc particles have an average diameter of 0.7 microns to 3 microns. The calcium carbonate can be natural calcium carbonate, calcium carbonate activated with a surface treatment (e.g. a stearic acid coating), or a precipitate calcium carbonate.

Peelable sealing layer 12 of the various embodiments of the invention includes an organoclay. Organoclay is based on clay with organic surface modification. Examples of useful clays are natural or synthetic layered oxides that include, but are not limited to, bentonite, kaolinite, montmorillonite-smectite, hectorite, fluorohectorite, saponite, beidellite, nontronite, illite clays, and combinations thereof. The organoclay is generally surface modified with organic onium ion or phosphonium ion. The onium ion can be protonated primary, secondary, tertiary amine or quaternary ammonium ion $(R_4N)^+$.

U.S. Pat. Nos. 5,780,376, 5,739,087, 6,034,163, and 5,747,560 provide specific examples of organoclays that are useful in practicing the present invention. The entire disclosure of each of these patents is hereby incorporated by reference. In one refinement of the present invention, the organoclay is present in an amount from 1 weight % to 20 weight % of the combined weight of the thermoplastic polymer, the organoclay, and the additional inorganic additive. In another refinement of the present embodiment, the organoclay is present in an amount from 2 weight % to 10 weight % of the combined weight of the thermoplastic polymer, the organoclay, and the additional inorganic additive.

The organoclay typically comprises a plurality of particles. These discrete particles may be derived from larger masses through a number of processes, most preferably through a well-known process called ion exchange that transforms clay from solely hydrophilic to a hydrophobic organoclay that contains both organic hydrophobic and inorganic hydrophilic ones and creating a chemically amphoteric system for further processing. An organoclay from this process is then introduced to polymer and further separated into exfoliated clay. In one variation, the organoclay comprises a plurality of particles having at least one spatial dimension less than 200 nm. In another variation, the organoclay comprises a plurality of particles having at least one spatial dimension less than 100 nm. In another variation, the organoclay comprises a plurality of particles having at least one spatial dimension less than 50 nm. In still another variation, the organoclay comprises a plurality of particles having spatial dimensions greater than or equal to 1 nm. In still another variation, the organoclay comprises a plurality of particles having spatial dimensions greater than or equal to 5 nm. In another variation, the organoclay comprises platelets having an average separation of at least 20 angstroms. In yet another variation, the organoclay comprises platelets having an average separation of at least 30 angstroms. In still another variation, the organoclay comprises platelets having an average separation of at least 40 angstroms. Typically, before combining with the thermoplastic polymer, the organoclay comprises platelets having an average separation between from 20 to 45 angstroms. Advantageously, upon combining with the thermoplastic polymer, the organoclay remains in a full or partially exfoliated state such that the average separation is maintained, decreased, or increased. In a variation of the present embodiment, it is useful for the organoclay to have a surface area greater than 100 $m^2$/gram and an aspect ratio greater than 10. In a refinement, the organoclay platelets have an average aspect ratio from about 50 to about 1000.

As set forth above, peelable sealing layer 12 also includes a thermoplastic polymer. Suitable thermoplastic polymers include, but are not limited to, nylons, polyolefins, polystyrenes, polyesters, polycarbonates, and mixtures thereof. In a variation, the thermoplastic polymer comprises a component selected from the group consisting of polyethylene, polypropylene, ethylene vinyl acetate, ethylene acrylic acid, ethylene ethyl acrylate, ethylene ionomers (e.g., the Surlyn® line of resins available from E.I. du Pont de Nemours and Company), and combinations thereof. Polyolefins are particularly useful thermoplastic polymers in the practice of the invention. In one variation, the polyolefin is selected from the group consisting of homopolymers and copolymers of ethylene, propylene, vinyl acetate, and combinations thereof. Ethylene vinyl acetate ("EVA") and blends of polyolefins with ethylene vinyl acetate ("EVA") copolymer are found to be particularly useful in forming peelable seals especially when the additive is an organoclay. EVA is a copolymer of ethylene and vinyl acetate. The amount of vinyl acetate in EVA varies from 3 to 40 weight %. Exemplary examples of the amount of vinyl acetate are 4%, 5.5%, 6%, 18% and 33%. It should also be appreciated that the additional layers (e.g., layers $L_1$-$L_n$, $L'_1$-$L'_{n'}$, $L_f$ set forth above in connection with formulae 1-6) may be formed from the same thermoplastic neat polymers that are included in the sealing layer.

The container sections of the various embodiments of the invention are formed from virtually any material used for packaging. Such materials include, but are not limited to, paper or paperboard, metal foil, polymeric sheets, metalized or otherwise coated polymeric sheets, and combinations thereof. More specific examples include, oriented or non-oriented polyester, oriented or non-oriented polypropylene, oriented or non-oriented nylon, and combinations thereof, made from adhesive lamination, extrusion lamination, coextrusion or coating process. Each of these materials may be coated or uncoated. Examples of useful coatings include, but are not limited to, varnishes, lacquers, adhesives, inks, and barrier materials (i.e., polyvinylidene chloride ("PVDC")). Useful materials for packaging medical devices include high density polyolefins. Tyvek® (a synthetic material made of high-density polyethylene fibers commercially available from DuPont, Inc.) is an example of such a material used for packaging medical devices.

In a variation of the packaging systems set forth above, the packaging systems are observed to have a thermal conductivity advantageously high to allow improved processing efficiency. Generally, the packaging systems have a thermal conductivity from about 0.40 W/m*K to about 10 W/m*K. In a refinement, the packaging systems have a thermal conductivity higher than about 0.40 W/m*K. In another refinement, the packaging systems have a thermal conductivity that is higher than 0.60 W/m*K. In still another refinement, the packaging systems have a thermal conductivity that is higher than about 0.80 W/m*K. Typically, the packaging systems have a thermal conductivity that is less than about 10 W/m*K.

Figure 5:
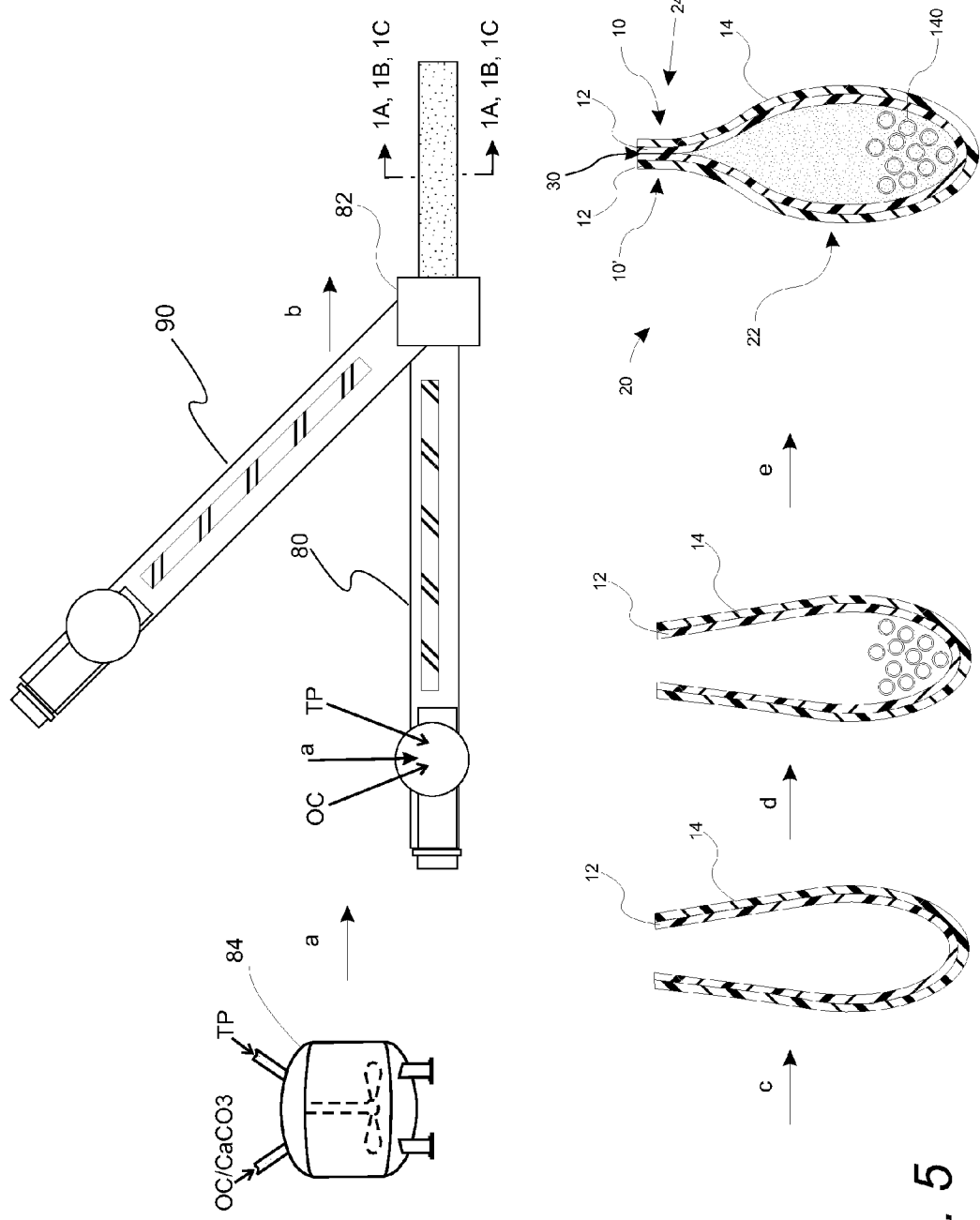
FIG. 5 is a diagram illustrating a method of processing and layering sealant substrate layers of the invention and forming the package system.

In yet another embodiment of the present invention, a method of forming the packaging system set forth above is provided. With reference to FIG. 5, a diagram illustrating the method of this embodiment is provided. A thermoplastic polymer ("TP") is combined with an organoclay ("OC") and an inorganic additive calcium carbonate ("CC") to form an organoclay/calcium carbonate-polymer composite ("OC/CCB") in step a). In one variation, this process occurs in extruder 80. Sealing layer 12 is then formed by extrusion from die 82 in step b) from the organoclay/calcium carbonate-polymer composite. In a variation, additional layers are formed by providing material from additional extruders (such as extruder 90) to die 82. In a refinement of the present embodiment, the thermoplastic polymer and the organoclay/calcium carbonate are premixed in mixer 84 and then introduced into extruder 80. Typically, sealing layer 12 will be formed along with or onto one or more additional layers 14, 16, 18, 19 (as shown in FIGS. 1A-E). Opened packaging system 20 is then formed in step c). This process may include steps in which the sides are sealed to produce the pouch structures of FIGS. 2-4. In a variation, the formation of opened packaging system 20 occurs during step b).

In a variation of the present embodiment, a thermoplastic polymer is combined with an organoclay and one or two or more inorganic additive(s), such as calcium carbonate, talc, by mixing an organoclay master batch, a calcium carbonate master batch and a talc master batch with a neat polymer or blends of more than one polymer. In a variation, the calcium carbonate master batch comprises the calcium carbonate and a portion of the thermoplastic polymer. In a refinement, the calcium carbonate master batch typically includes from 10 to 80 weight % calcium carbonate. In another variation, the organoclay master batch comprises the organoclay and at least a portion of the thermoplastic polymer. In a refinement, the master batch typically includes from 10 to 80 weight % organoclay. In yet another variation, the talc master batch comprises the talc and at least a portion of the thermoplastic polymer. In a refinement, the master batch typically includes from 5 to 80 weight % talc.

Calcium carbonate is well known for its thermal conductivity (Roussel, et al. "*The use of calcium carbonate in polyolefins offers significant improvement in productivity*", TAPPI 2005). Thermal conductivity of calcium carbonate is 2.7 W/(m*K) and for neat polyolefin, it is usually less than 0.5 W/(m*K). Introducing calcium carbonate to the sealant formulation provides the ability to quickly heat up and melt the polymer resin. The combination of OC and CC with Talc delivered a similar effect. (Table 5). On the other hand, clay has high heat storage capacity. It tends to hold the heat longer. The combination of organoclay and calcium carbonate offers synergistic effect and facilitates quick melt of the sealant with slow cooling, which allows time for the polymer blend to flow and caulk the channels, and provides improved caulkability.

The step of forming sealing layer 12 is accomplished by any method capable of producing layers or films from thermoplastic compositions. Examples of such methods include, but are not limited to, cast film techniques, blown film techniques, extrusion, co-extrusion, extrusion coating, blow molding, cast molding, extrusion, extrusion coating, lamination, blow molding, simultaneous film stretching, and film blowing.

Still referring to FIG. 5, the method of the present embodiment optionally further comprises placing object(s) 40 within opened packaging system 20 (step d). Typically, object(s) 40 reside within container section 22. After object(s) 40 are placed within container section 22, sealing layer 12 is contacted with a sealing substrate (i.e., sealing structure 10') during step e) to form a seal. Sealing may be accomplished by any number of sealing methods known in the art. Examples include, but are not limited to, conduction heat sealing, ultrasonic sealing, impulse heat sealing and induction sealing.

The following examples illustrate the various embodiments of the present invention. Those skilled in the art will recognize many variations that are within the spirit of the present invention and scope of the claims.

Example 1

Comparison of Sealant Containing Organoclay and Calcium Carbonate

Figure 6:
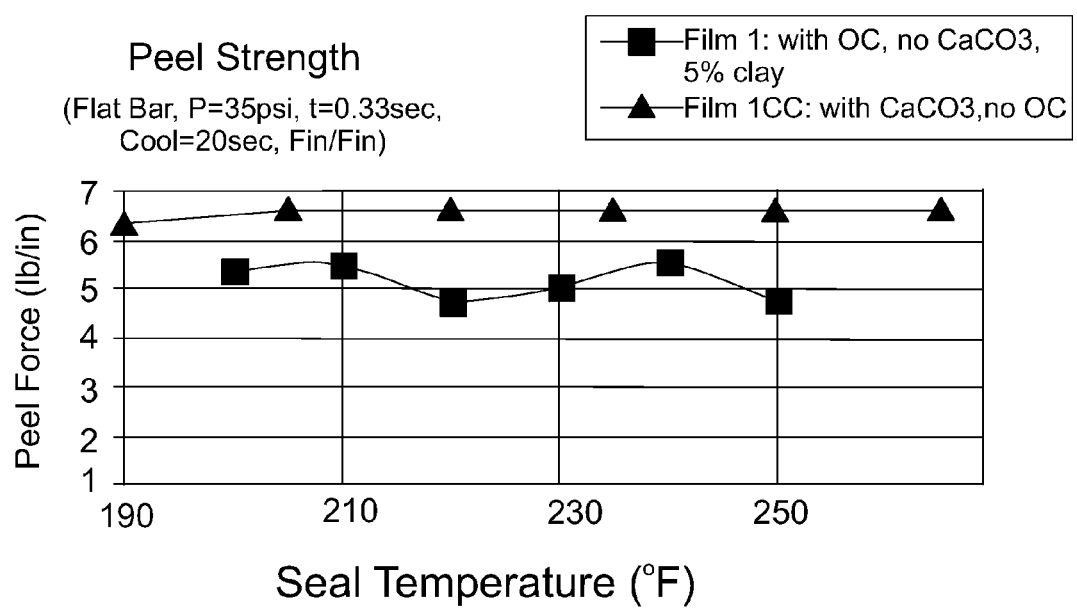
FIG. 6 provides plots of the peel strength versus sealing temperature for seals made from a thermoplastic polymer/calcium carbonate composition and a thermoplastic polymer/organoclay composition.

A five layer film was prepared to contain HDPE/LLDPE/LLDPE/tie/sealant layers. The sealant layer contained 10.4 weight % of calcium carbonate and no organoclay, in a blend of polyethylene (Exact 3131 by ExxonMobil) and EVA (Ateva 1811 by Celanese Corporation with 18% vinyl acetate). The $CaCO_3$ master batch (CCMB) was a proprietary formulation containing about 80 weight % $CaCO_3$. CCMB was made at Heritage Plastics under the trade name of HM-10 MAX® (melt flow index 1.40 g/10 min, density 1.92 g/cm$^3$). This film was compared with a second film (Film 1) having an organoclay sealant layer and no calcium carbonate. This film was discussed as 5% clay in patent US 2008/0118688A1, FIG. 7A. The organoclay master batch (OCMB) was a proprietary formulation containing about 60 weight % organoclay, manufactured by PolyOne under the trade name EXP MB 231-615®. Peel force was tested on Lako SL-10. The films were sealed on a flat seal bar fin to fin, with pressure at 35 psi, a dwell time of 0.33 second and a cooling time of 20 seconds. FIG. 6 provided a plot of the peel force versus temperature for a seal formed from these two films. The film containing calcium carbonate sealant was peelable when sealed at 190° F. with a peel force of 6.3 lb/in. As seal temperature increased to 205° F., the seal was welded at the seal site and was not able to peel apart; some of the films broke at the seal edge during peeling. Since the film was not peelable, the force measured was not accurately representing the peel force. For purposes of the plot, a peel force of 3000 g/in (6.8 lbs/in) was recorded. In the case of the organoclay/calcium carbonate containing sealant composition, the seal was peelable over a wide seal temperature range from 190° F. to 260° F. as shown in FIG. 6.

Example 2

Sealant Contains Blend of Organoclay with Calcium Carbonate

Film samples 2, 3, 4, 5 and 6 were prepared for testing. They were five layer films containing HDPE/LLDPE/LLDPE/tie/sealant layers. Sealant blends of these films were formulated to contain different ratios of organoclay and calcium carbonate. Film 2 contains 78 weight % of EVA (18% vinyl acetate, Ateva 1811, Celanese Corporation), 10 weight % of metallocene LLDPE (Exact 3131), 6 weight % of OCMB and 6 weight % of CCMB. The OCMB contains about 60 weight % organoclay, and is purchased from PolyOne under the trade name EXP MB 231-615®. The CCMB is from Heritage Plastics under the trade name of HM-10 MAX® (melt flow index 1.40 g/10 min, density 1.92 g/cm$^3$).

Sealant formulation of Film 3 contains 6 weight % of OCMB and 13 weight % of CCMB, 71 weight % of EVA (18% vinyl acetate, Ateva 1811, Celanese Corporation), 10 weight % of metallocene LLDPE (Exact 3131). In sealant formulation for Film 4, OCMB loading was increased to 10 weight % and CCMB loading was unchanged at 6 weight %, along with 74 weight % of EVA (18% vinyl acetate, Ateva 1811, Celanese Corporation) and 10 weight % of metallocene LLDPE (Exact 3131). For Film 5, OCMB loading in the sealant formulation was further increased to 13 weight % and CCMB loading was unchanged at 6 weight %, along with 71 weight % of EVA (18% vinyl acetate, Ateva 1811, Celanese Corporation) and 10 weight % of metallocene LLDPE (Exact 3131). Sealant blend for Film 6 consisted of high loading of OC and CC, with 13 weight % OCMB, 12 weight %, CCMB, 65 weight % of EVA (18% vinyl acetate, Ateva 1811, Celanese Corporation) and 10 weight % of metallocene LLDPE (Exact 3131).

Figure 7:
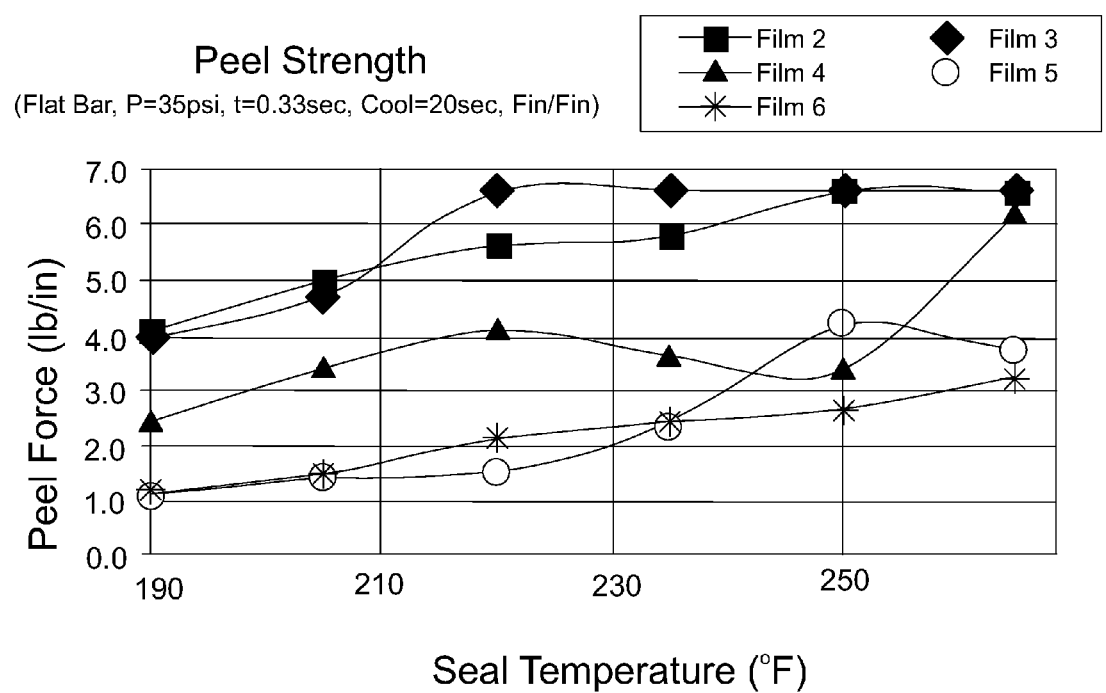
FIG. 7 provides plots of the peel strength versus sealing temperature for seals made from compositions having varying amounts of organoclay and calcium carbonate.

FIG. 7 provides plots of the peel strength versus the sealing temperature for seals made from these compositions having different ratios of organoclay (OC) to calcium carbonate (CC). At 6 weight % of OCMB, Films 2 and 3 had narrow peelable windows and gradually became non-peelable as sealing temperature increased. When OCMB loading was increased to 10 weight % (Film 4), the peelable range widened, and the film was peelable below 265° F. When the weight % of OCMB was further increased to 13%, or above, Films 5 and 6 provided peelablility over the entire sealing range from 190° F. to 265° F. In addition, FIG. 7 clearly illustrates that some combinations of organoclay/calcium carbonate produce peelable seals over a broad range of sealing temperatures while others do not.

Example 3

Higher Loading of CCMB in Sealant Blend Containing OC and CC

Figure 8:
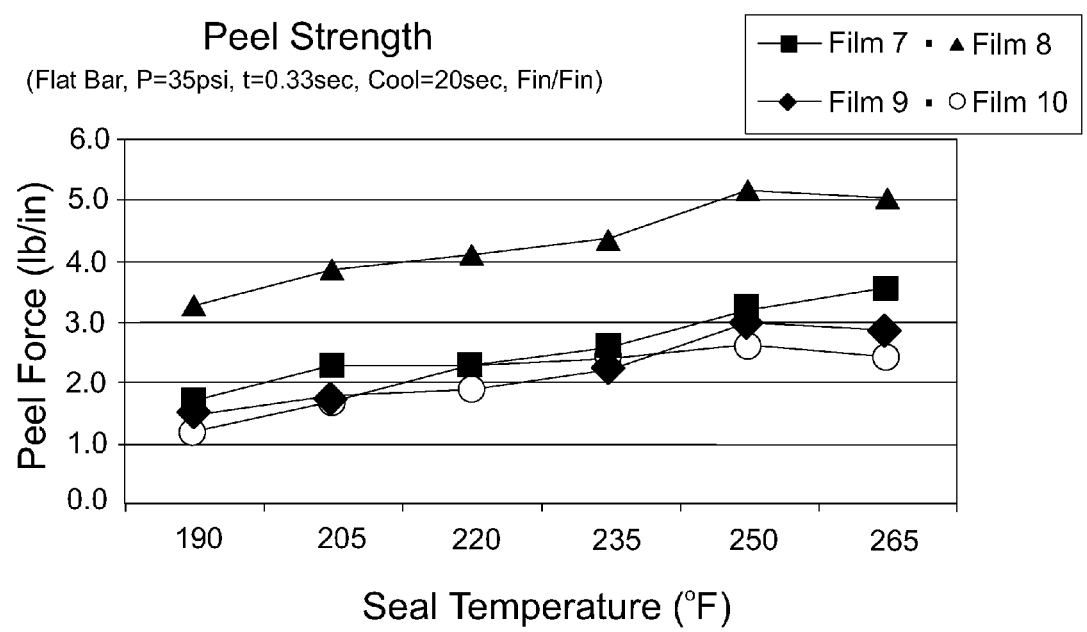
FIG. 8 provides plots of the peel strength versus sealing temperature for seals made from compositions having organoclay and high levels of calcium carbonate.

Additional test films were prepared with more variables in organoclay and calcium carbonate combination for peelable sealant formulations. Films were constructed as a five layer structure containing HDPE/tie/Nylon/tie/sealant. Table 1 lists the detailed sealant layer formulations, and FIG. 8 plots the seal force over sealing temperature

TABLE 1

| Film # | EVA | OCMB | CCMB | LLDPE |
|---|---|---|---|---|
| 7 | 65% | 13% | 12% | 10% |
| 8 | 68% | 10% | 12% | 10% |
| 9 | 65% | 10% | 15% | 10% |
| 10 | 58% | 12% | 20% | 10% |

All films in this series have a peel force within an easy open range of 1 to 5 lb/in. Film 8, with 10% OCMB and 12% CCMB in the sealant blend, had a peel force range from about 3 lb/in to 4.5 lb/in. Sealant blend for film 9 had the same OCMB loading as of film 8, but with CCMB loading increased to 15 weight %. The peel force was reduced from 3 to 4.5 lb/in for film 8 to about 1.5 to 3 lb/in range for film 9. While keeping the OCMB at 10 weight %, the CCMB was increased to 15 weight % (film 9) resulting in the peel force falling well within the peelable range. Film 10 contains 12% OCMB and 20% CCMB. As set forth in FIG. 9, the peel curve for film 10 is observed to be almost flat from a seal temperature of 190° F. to 265° F.

Example 4

Higher Loading mLLDPE in Sealant Blend Containing OC and CC

Figure 9:
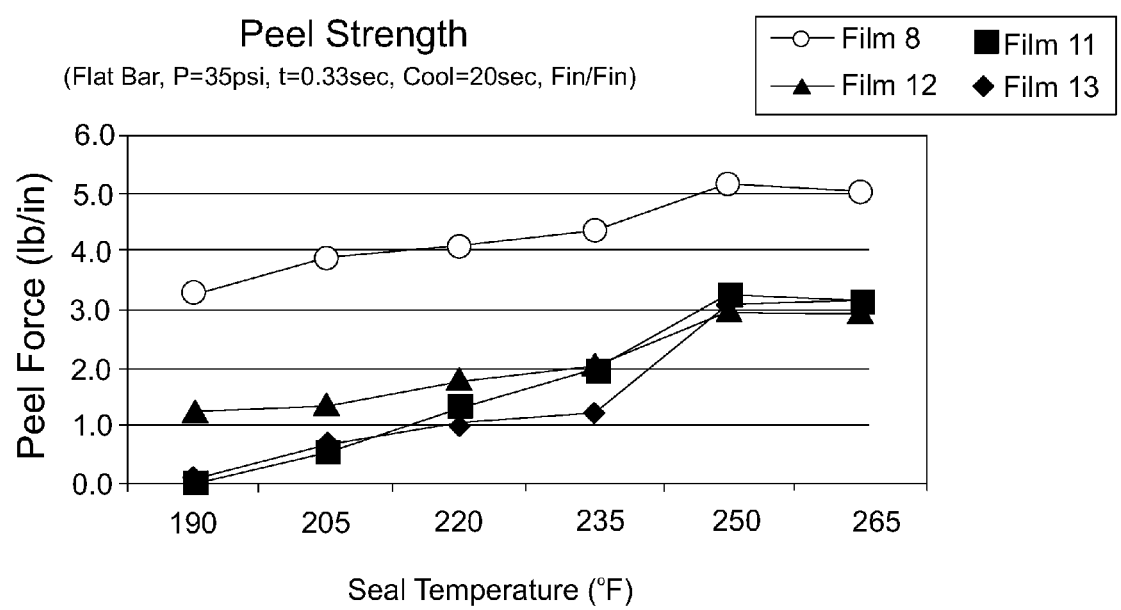
FIG. 9 provides plots of the peel strength versus sealing temperature for seals made from compositions having organoclay and metallocene LLDPE.

Five layer films HDPE/tie/Nylon/tie/Sealant were prepared. The details for these films are set forth in Table 2. Sample 11 was prepared to compare with sample 8. Samples 13 and 12 provide additional results demonstrating the effect of higher weight % of mLLDPE and its influence on peel force. High loading of mLLDPE (34% vs. 10% for films 11 and 8; and 24% vs. 10% for films 13 and 12) resulted in a reduction of the seal force at lower temperature ranges, and made it impossible to achieve a quality seal. Such high mLLDPE loading necessitates that the seal initiation temperature (SIT) be increased to 220° F., which is not favored. FIG. 9 shows the peel force vs. the seal temperature.

TABLE 2

| Film # | EVA | OCMB | CCMB | LLDPE |
|---|---|---|---|---|
| 8 | 68% | 10% | 12% | 10% |
| 11 | 44% | 10% | 12% | 34% |
| 12 | 74% | 13% | 3% | 10% |
| 13 | 60% | 13% | 3% | 24% |

Example 5

Age Effect of the OC and CC Containing Sealant

The existing polybutylene (PB-1) based sealant is well known for its ability to form a seal that is easily opened. The aging effect of the PB-1 based sealant have been described (Charles Hwo, "*Polybutylene Blends as Easy Open Seal Coats for Flexible Packaging and Lidding*," EFFECT J PLASTIC FILM AND SHEETING, 1987 v3, 245). During aging, PB-1 goes through a phase transformation from melt-stable Form II crystals to Form I crystals within 2-3 days at ambient temperature and pressure. During phase transformation, crystallinity gradually increases and results in a higher peel force.

In order to examine the age effect of OC and CC containing sealants, the film was sealed and tested after aging. On the same day of testing on an aged sample, a set of films were freshly sealed and the peel force was tested as a control. The film was cut into one inch strips and sealed, sealant to sealant, at a flat jaw with upper temperatures at 220° F. and a lower jaw at 220° F., and a dwell time of 0.3 second. Testing of the peel force was done at Instron tensile tester using a 100 lb load cell with a crosshead speed of 12 in/min. Table 3 summarizes the peel force results for this test.

TABLE 3

| | | Peel force after 1 week of aging | | |
|---|---|---|---|---|
| | | g/in | g/in | % change |
| Film 1 | OC only | 743 | 696 | −6.3% |
| Film 7 | OC/CC | 1104 | 1068 | −3.3% |

As polybutylene based sealant has increased peel force upon aging, the OC containing and OC/CC based sealant do not show any increase in peel force. After 1 week of aging, the peel force for OC and OC/CC are slightly decreased, which is similar to fresh sealed samples since the difference here is within experimental error.

Example 6

Caulkability and Rheology Testing

One of the most important functions of a sealant is to maintain the complete integrity of a package. Functional sealants should have good heat seal strength, low initiation temperature, and be able to seal completely through the folds, contaminants, and wrinkles that occur in an actual packaging environment. Testing the integrity of flexible packages allows better prediction of "real-life" performance. One way to characterize such behavior of the sealant is the "caulkability" of a sealant resin.

Generally, materials exhibiting good caulkability are able to prevent recoil of any plug-flow during the sealing process. Rheologically, this behavior has been exhibited for materials having a solid-like character (tendency to store energy elastically) at lower experimental frequencies (longer experimental times). The sealant compositions of EVA/LLDPE/OC/CC are found to exhibit such characteristics.

Figure 10:
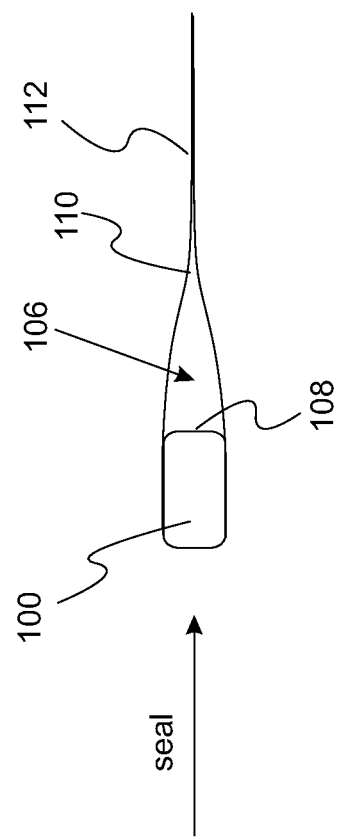
FIG. 10 provides an illustration of the caulking test method in which caulking slope and ultimate sealing thickness is calculated.
Figure 10:
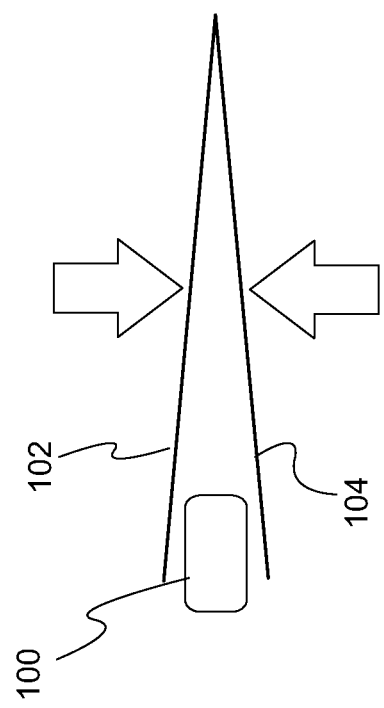
Figure 11:
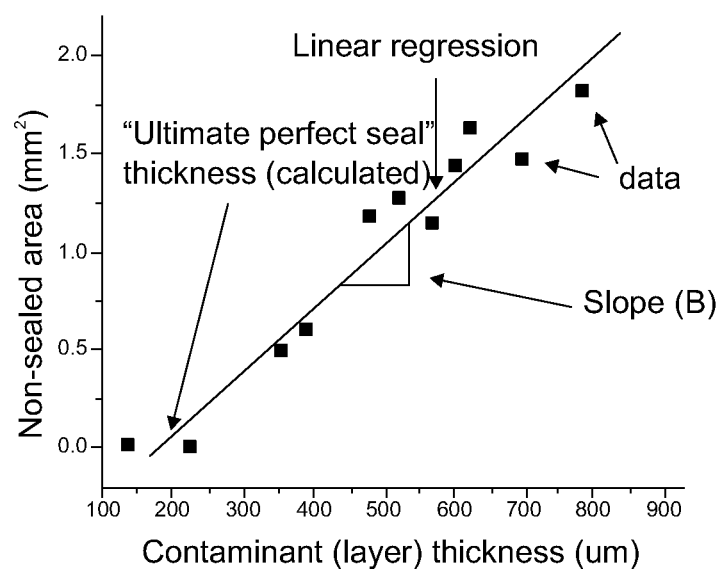
FIG. 11 provides a plot of unsealed area versus contaminant thickness used to determine caulkability slope and ultimate sealing thickness in the caulkability test method.

One of the test methods on caulkability is illustrated in FIG. 10 and FIG. 11. Monolayer films of the sealant, or multilayer packaging films bearing an external layer of sealant, are formed into a square 3"×3" envelope with three sides sealed and one side unsealed. One 0.25"-wide rectangular "obstacle" is inserted in the middle of the open (non-sealed) side and a flat heat-seal line is forced across the obstacle (the study is performed for multiple envelopes of the same sealant with obstacles that increase in height from 0.25 mils to 35 mils; all seals are made under the same conditions with an industrial-relevant sealer, e.g. impulse sealer, flat-platen sealer, etc.). For the purposes of this work, rigid rectangular obstacles, such as kapton-tape or copper-tape, varying in height from 0.25 mils to 35 mils, were used, mimicking rigid obstacles in practice, such as food particles, zippers, wrinkles and folds formed into gussets, such as food particles, zippers, etc. More preferably, flexible polyethylene-based rectangular obstacles were used with a varied height of 0.25 mils to 35 mils, mimicking obstacles of packaging material in practice, such as wrinkles, folds, gussets, etc. If an unsealed area (leaker) is formed next to the obstacle, its area is measured. From the measurements made, two metrics are used to quantify the caulking ability (or caulking quality) of a sealant. The first metric is the maximum height of the rectangular obstacle that can be perfectly (hermetically) sealed-over, referred to hereafter as "ultimate perfect seal thickness"; the second metric is the rate of increase of the leaker-area with respect to the increase in the obstacle height, termed hereafter as "leaker growth rate". By definition, when comparing two sealants, the one having better ability to caulk will be characterized by a larger ultimate perfect seal thickness and a smaller leaker growth rate.

Figure 12A:
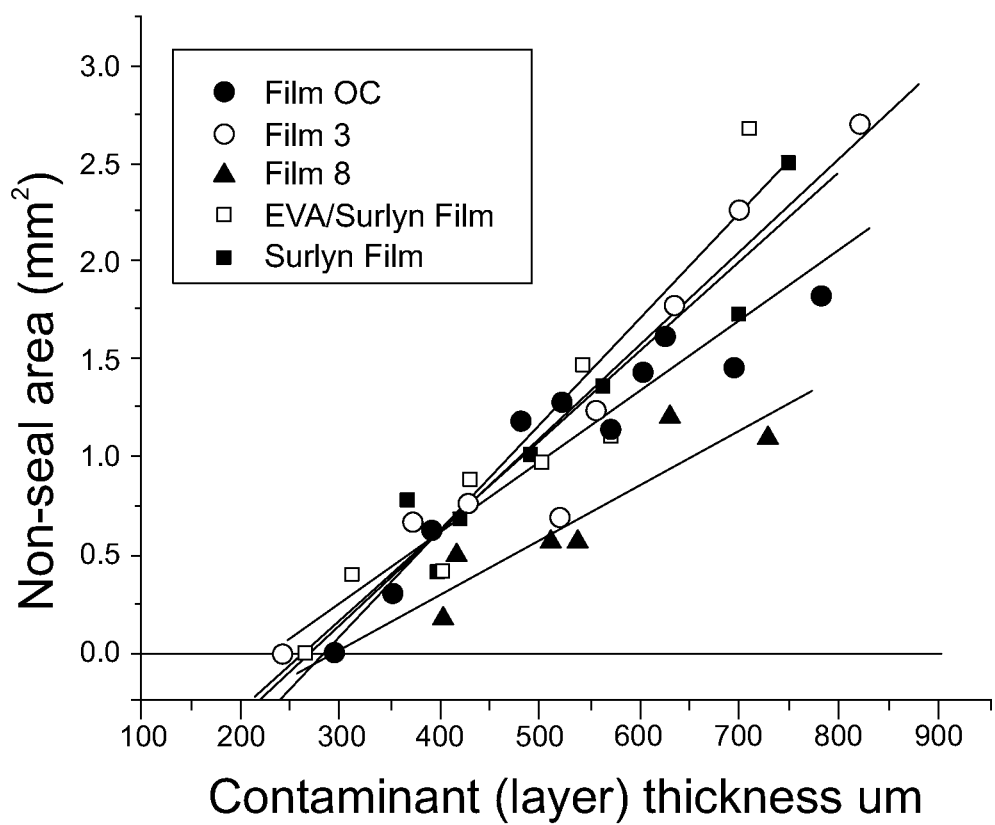
FIG. 12A provides a series of plots of unsealed area versus contaminant thickness for various polymer/organoclay/calcium carbonate combinations.
Figure 12B:
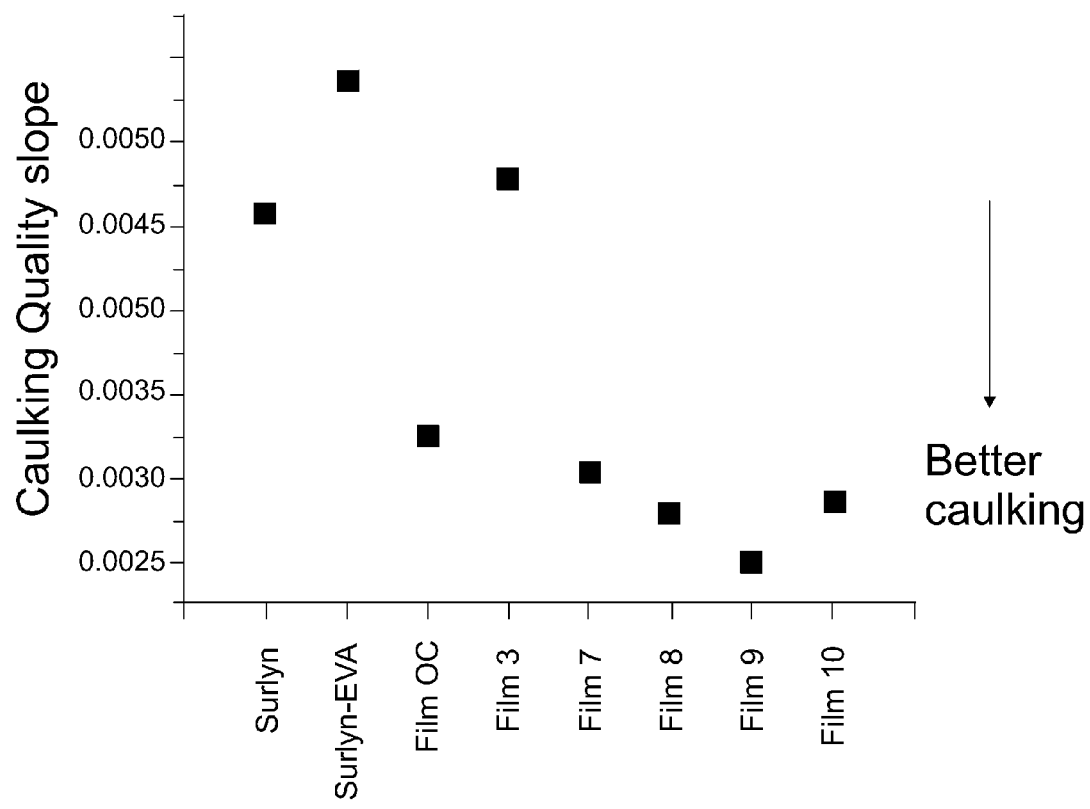
FIG. 12B provides the caulking slope for various film compositions.

With reference to FIG. 10, the caulking test method introduces a gap with a flat wire near the sealing region to simulate a contaminant during the heat seal process. By introducing a gap using a flat wire 100 of a certain thickness during the sealing of films 102, 104, unsealed area 106 is measured using optical microscopy. As illustrated in FIG. 10, it is hard to seal at the edge of the gap. Therefore, unsealed area 106 is located from edge 108 of flat wire 100 to edge 110 of sealed area 112. A lower reading of the unsealed area represents better caulkability and enhanced ability to provide a hermetic seal. The results of this test depend on a number of parameters such as sealant thickness and sealing temperature/pressure. Several specimens for each sample are evaluated at different contaminant thicknesses. The tests are performed using the same sealant layer thickness when comparing different sealant formulations. In a plot of non-sealed area vs. contaminant thickness as illustrated in FIG. 11, caulkability parameters can be determined from the slope and the ultimate contaminant thickness for a perfect seal. Ultimate perfect sealing thickness is the contaminant thickness at a non-seal area of zero, which is calculated by extrapolation of the curve to the zero non-seal area. In this figure, the non-sealed area is plotted as a function of contaminant thickness. The contaminant thickness is the thickness of the flat wire. The data is fit by linear regression (e.g., a least squares fit) with the caulking slope being the slope of the fitted line. The ultimate sealing thickness is the contaminant thickness at a non-seal area of zero. FIG. 12A provides plots for several formulations. FIG. 12B shows the caulking slope of different samples. In order to understand the scope of this data, control samples are tested alongside of the organoclay and calcium carbonate samples. Comparable samples include Surlyn 1601 and Surlyn/EVA blend.

As set forth above, the lower the caulking slope, the better the caulking Without the presence of organoclay, Surlyn has the best caulking With the addition of organoclay in the sealant formulation, all samples that contain organoclay demonstrated similar, if not better, caulkability to Surlyn. For a system that combines organoclay with calcium carbonate, all the blends have better caulking than organoclay only film, and better caulking than Surlyn. These blends indicate the synergistic effect between organoclay and calcium carbonate that attributes to a better performing sealant.

The samples were also evaluated by linear oscillatory rheology testing. Strain sweep tests were first performed at a frequency of 1 rad/s to determine the linear viscoelastic region. Subsequently, oscillatory rheology frequency sweep tests from 100 to 0.1 rad/s were performed at strains inside the linear viscoelastic region. All rheological tests were performed in a RDS II Rheometer using 25 mm diameter parallel plates, under $N_2$ atmosphere. Data was acquired at four different temperatures: 130° C., 160° C., 190° C. and 220° C., and subsequently shifted using the time-temperature superposition (t-TS) principle to form the reduced curves at a reference temperature of 130° C.

Figure 13A:
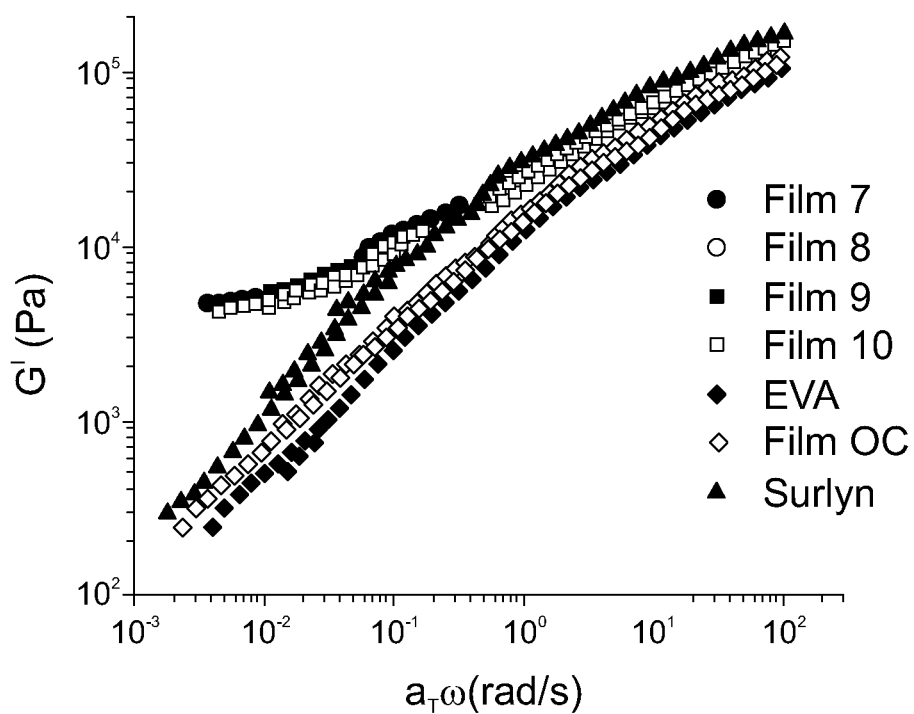
FIGS. 13A and B provide plots of G' and G" versus frequency ($a_T\omega$) for a number of compositions.
Figure 13B:
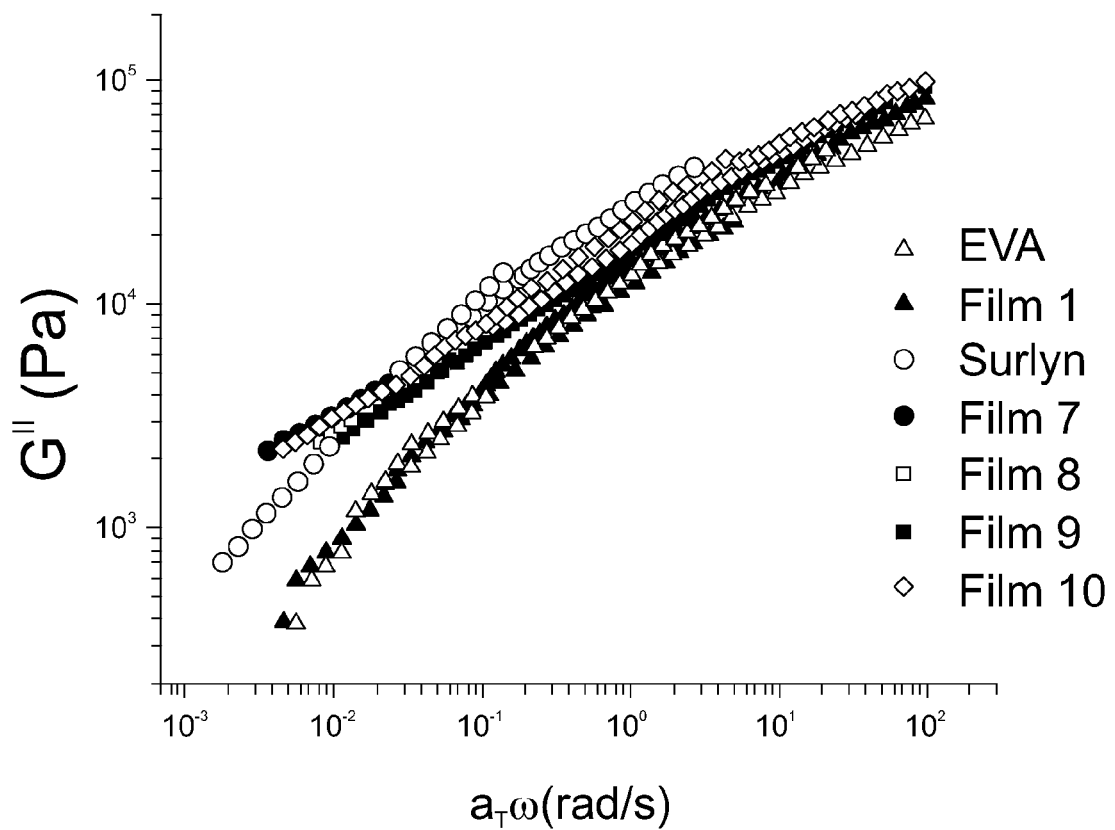

In such experiments, solid-like behavior is evaluated from plots of G' and G" versus reduced frequency ($\omega^* a_T$). The viscoelastic behavior of the system at $\omega$ is characterized by the storage modulus or elastic modulus G'($\omega$), and the loss modulus or viscous modulus, G"($\omega$), which respectively characterizes the solid-like and fluid-like contributions to the measured stress response. The two viscoelastic parameters are used to detect the solid-like behavior and the relaxation time (inverse of the G' and G" crossover) and the slope of the G' versus $\omega^* a_T$ curve at very low $\omega^* a_T$ (frequency) values. Higher relaxation times (or the lower the slope) tend to result in increased solid-like character with high elastic solid phase storage energy to recover, and thus the better caulking FIGS. 13A and B provide plots of G' and G" versus frequency ($\omega^* a_T$) for a number of compositions. Rheology response of all CC/OC composites are similar, but quite different from the OC only sealant. For the CC/OC sealant, G' became almost independent of frequency at very low frequencies, which correlates with solid-like behavior (better caulking). The results of these plots are provided in Table 4 and FIG. 14. Since G' and G" crossover was not detected in all the samples, the parameter G'/$a_T\omega$ is used for assessing correlations with the caulkability.

TABLE 4

Rheological Results

| | G' G" cross over relaxation time at 130° C. (s) | Flow activation energy (KJ/mol) | Slope (G'/aT$\omega$) |
|---|---|---|---|
| EVA (Ateva1811) | 0.66 | 57.7 | 0.71 |
| Surlyn 1601 | 0.33 | 68.9 | 0.71 |
| Film OC | 0.26 | 53.3 | 0.67 |
| Film 7 | — | 54.8 | 0.16 |
| Film 8 | — | 46.4 | 0.22 |
| Film 9 | — | 41.9 | 0.25 |
| Film 10 | — | 56.3 | 0.20 |

Correlation Between Caulkability and Rheology Parameters

Figure 14A:
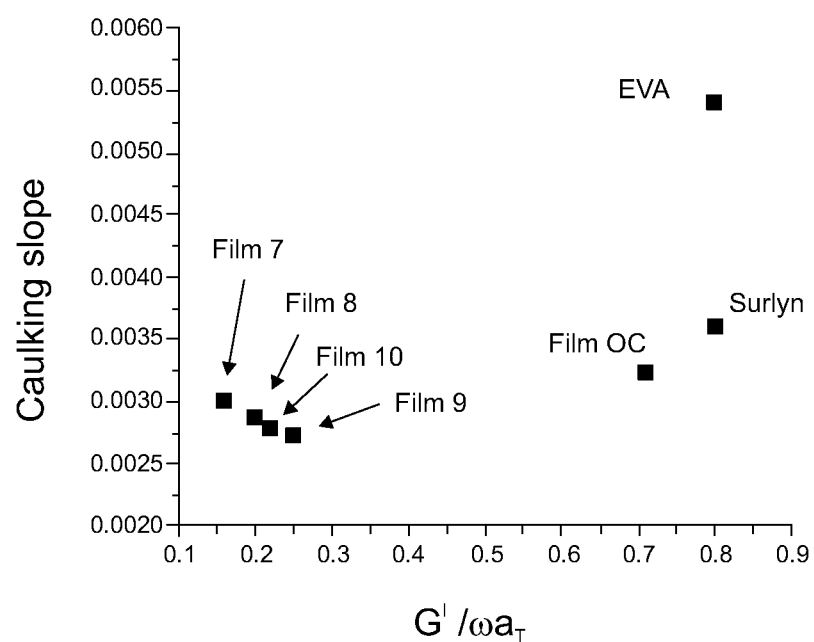
FIG. 14A provides a plot of caulking slope from $G'/a_T\omega$.
Figure 14B:
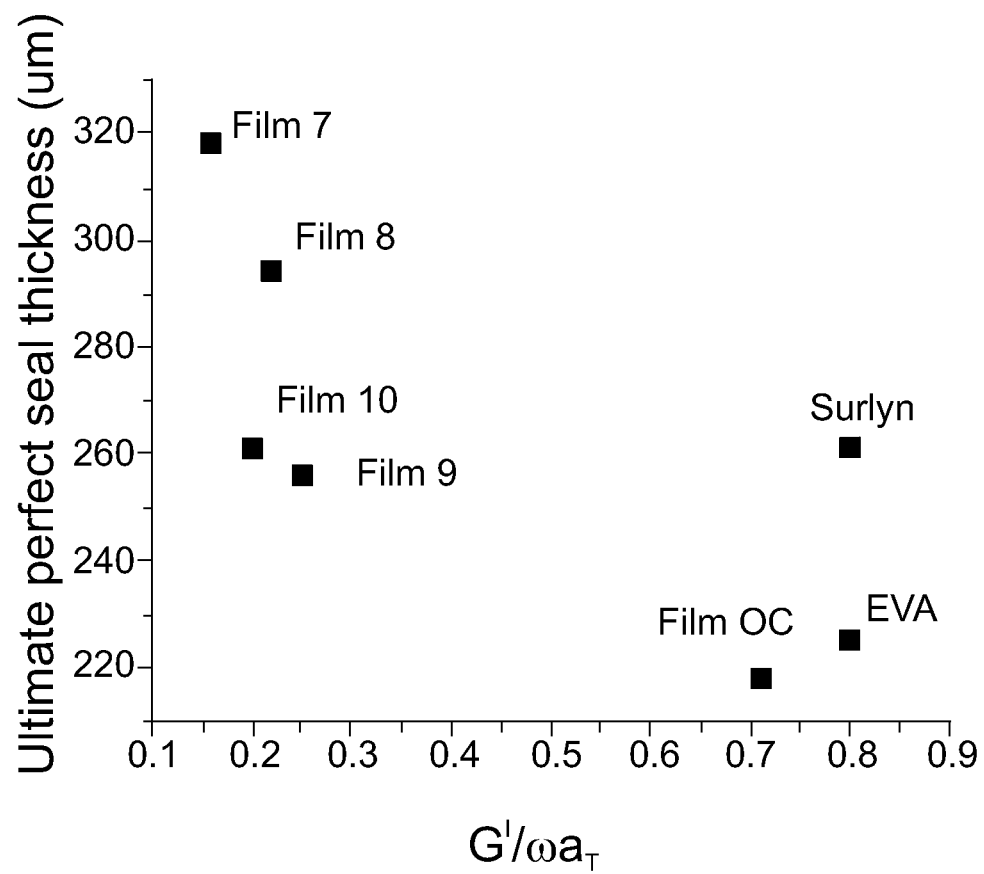
FIG. 14B provides a plot of the ultimate perfect seal thickness versus $G'/a_T\omega$.

FIG. 14A provides a plot of the ratio of the caulking slope versus G'/$a_T\omega$ for various samples. Lower values G'/$a_T\omega$ correspond to higher solid-like behavior and better caulkability with higher storage energy. FIG. 14B provides a plot of the ratio ultimate sealing thickness versus G'/$a_T\omega$ for various samples. It is observed that the OC/CC samples have the best caulking and the neat polymer blend have the worst.

Figure 15:
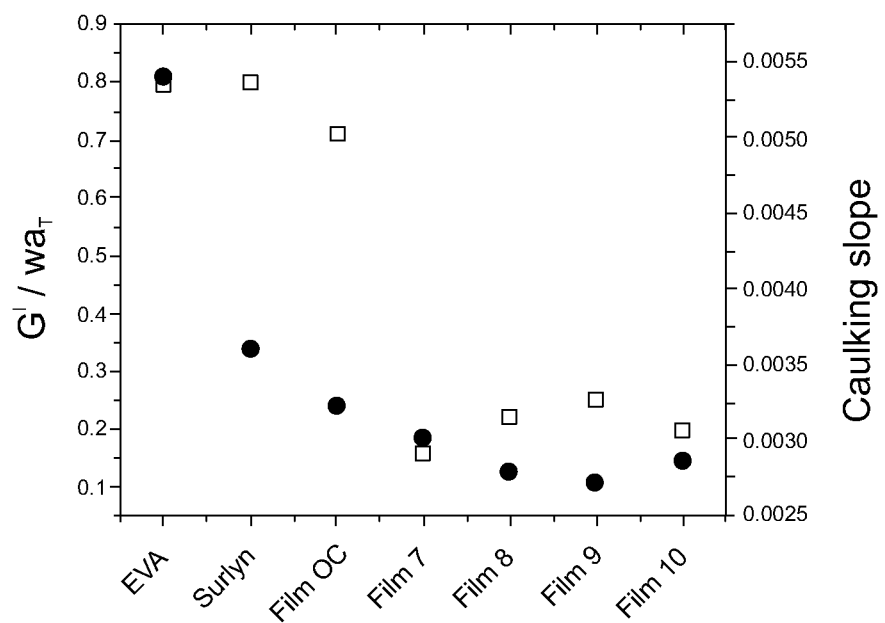
FIG. 15 provides a plot of the ratio $G'/a_T\omega$ and the caulking slope for various samples.

FIG. 15 provides a plot of the caulking slope and G'/$a_T\omega$ for the value sealants. Lower values G'/$a_T\omega$ and caulking slope correspond to greater solid-like behavior. The OC/CC samples have the best behavior for the composition and the neat polymer blends have the worst. Similarly, with respect to "ultimate perfect seal thickness", the OC/CC samples exhibit the best behavior while the neat polymer blend exhibits the worst.

Example 7

Thermal Conductivity Estimation

Differential Scanning calorimetry (DSC) method was employed to estimate thermal conductivity of the sealant containing OC and CC. Pellets of different sealant blends were extruded and injection molded into test bars. A small sample at an approximate size of 4 mg was cut from the test bar, and encapsulated in standard DSC pans. DSC was performed with TA Instruments Q100 equipment. Prior to the test, a heating cycle of 10° C./min was performed to erase the thermal history of the blend. The test was performed in three subsequent cycles of heat-cool-heat experiments between 30° C. to 160° C., with various heating and cooling rates. The first cycle was run at a rate of 5° C./min, the second cycle at 10° C./min and the third cycle rate at 20° C./min. As shown in FIG. 16, the DSC scans contain signals from EVA that has one crystalline region and LLDPE displays two crystalline regions, exhibited as exothermic peaks. Both EVA/LLDPE/OC and EVA/LLDPE/OC+CC samples exhibit two crystalline regions: a big and broad melting peak around 80° C. that correlates to EVA and LLDPE co-monomer, and a smaller and sharper peak at around 120° C. corresponding to LLDPE. Thermal conductivity from this measurement was reported.

Thermal conductivity is the quantity of heat transmitted, due to unit temperature gradient, in unit conditions in a direction normal to a surface of unit area. It is measured as heat flow rate (watt) over distance (meter) and temperature gradient (Kelvin), and reported in unit of watt/(meter*Kelvin), simplified as k (W/m*K). Table 5 listed the thermal conductivity on films with sealant containing, LLDPE only, OC only, CC only and different combinations of OC/CC. The sealant formulations with only LLDPE, only OC or only CC had thermal conductivity in the range from 0.34 to 0.40 W/m*K. When both OC and CC are present in the sealant formulation, the thermal conductivity increased significantly to a range of 0.80 to 1.00 W/m*K. This accounts for about more than 100% improvement. It clearly demonstrated that the combination of OC with CC delivers a synergistic effect, and thus much higher thermal conductivity enhancement compared to solely CC or OC containing sealant.

TABLE 5

Thermal conductivity measured by DSC

| | k/(W/m*K) |
|---|---|
| LLDPE only | 0.40 |
| OC only | 0.40 |
| CC only | 0.34 |
| Film 2 | 0.80 |
| Film 3 | 0.82 |
| Film 7 | 1.00 |
| Film 8 | 0.83 |

Examples of Peelable Seals Having Organoclay, Calcium Carbonate and Talc

Example 8

Sealant Contains Calcium Carbonate or Talc

A five layer film was prepared to contain HDPE/tie/nylon/tie/sealant layers. Film 11 has a calcium carbonate containing sealant layer without any additional inorganic filler. The CCMB was a proprietary formulation containing about 80 weight % $CaCO_3$, made by Heritage Plastics under the trade name of HM-10 MAX®.

Film 12 has Talc containing sealant layer without any additional inorganic fillers. The Talc master batch (Talc MB) is manufactured by PolyOne under the trade name CC1011110260 AB-PE-0002®.

Figure 17:
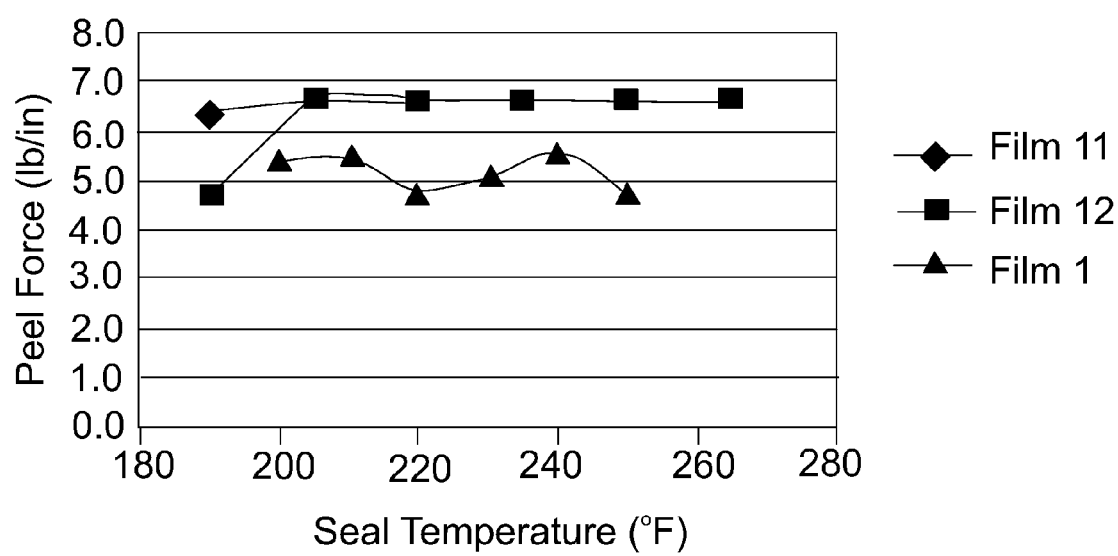
FIG. 17 provides a plot of the peel force versus temperature for a seal formed from a film having organoclay, calcium carbonate, or talc.

Peel force was tested on Lako SL-10. FIG. 17 plotted the peel curve of Film 1, Film 11 and Film 12. Neither calcium carbonate nor talc as an inorganic filler could deliver peelable sealant, rather they provided locked seal.

Example 9

Sealant Contains Blend of Oranoclay with Talc

The sealant layer of Film 13 contained 13 weight % of OCMB batch and 10 weight % of Talc MB in a blend of polyethylene (Exact3131® by ExxonMobil) and EVA (Ateva 1811® by Celanese Corporation with 18% vinyl acetate). The organoclay master batch (OCMB) was a proprietary formulation manufactured by PolyOne under the trade name MB 231-615®. The Talc master batch (Talc MB) is manufactured by PolyOne under the trade name CC1011110260 AB-PE-0002®.

The sealant layer of Film 14 contained 10 weight % of OCMB, and 20 weight % of Talc MB in a blend of polyethylene and 18% vinyl acetate EVA.

Figure 18:
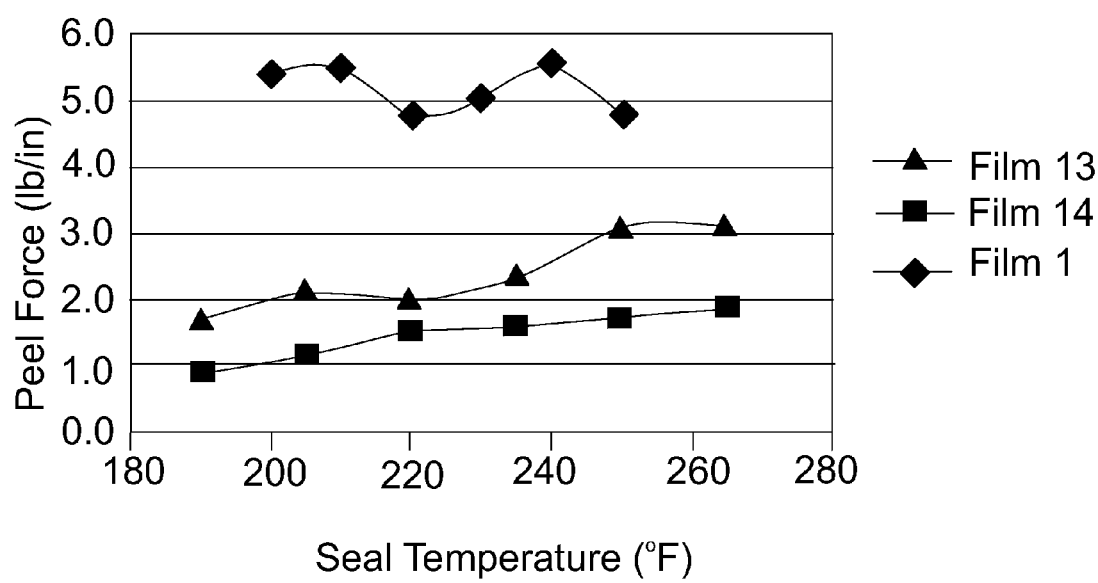
FIG. 18 provides a plot of the peel force versus temperature for a seal formed from a film having talc and organoclay.

Peel force was tested on Lako SL-10. FIG. 17 provides a plot of the peel force versus temperature for a seal formed from this film. FIG. 18 shows the peel force of Film 13 and Film 14, compared with Film 1. Both film 13 and film 14 were peelable.

Example 10

Sealant Contains Blend of Oranoclay with Calcium Carbonate and Talc

The sealant layer of Film 15 contained 15 weight % of CCMB, and 13 weight % of OCMB, and 10 weight % of Talc MB in a blend of polyethylene and 18% vinyl acetate EVA. The sealant layer of Film 16 contained 15 weight % of CCMB, and 8 weight % of OCMB, and 8 weight % of Talc MB in a blend of polyethylene and 18% vinyl acetate EVA.

Figure 19:
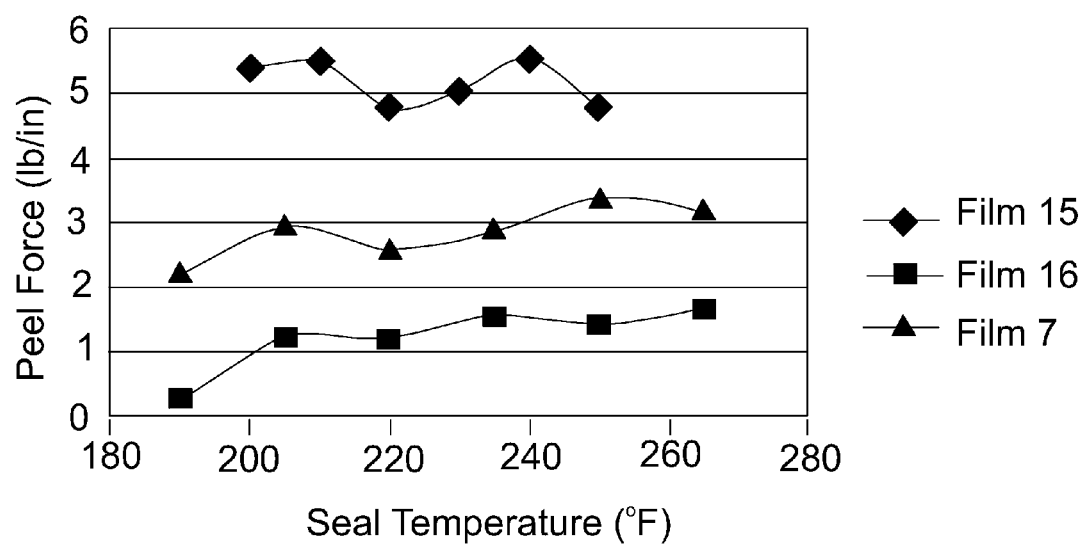
FIG. 19 provides a plot of the peel force versus temperature for a seal formed from a film having organoclay, calcium carbonate, and talc.

Peel force was tested on Lako SL-10. FIG. 19 provided a plot of the peel force versus temperature for a seal formed from this film. The peel force of Film 15 and Film 16 fell into peelable sealant range.

Example 11

Thermal Conductivity Estimation

Figure 16A:
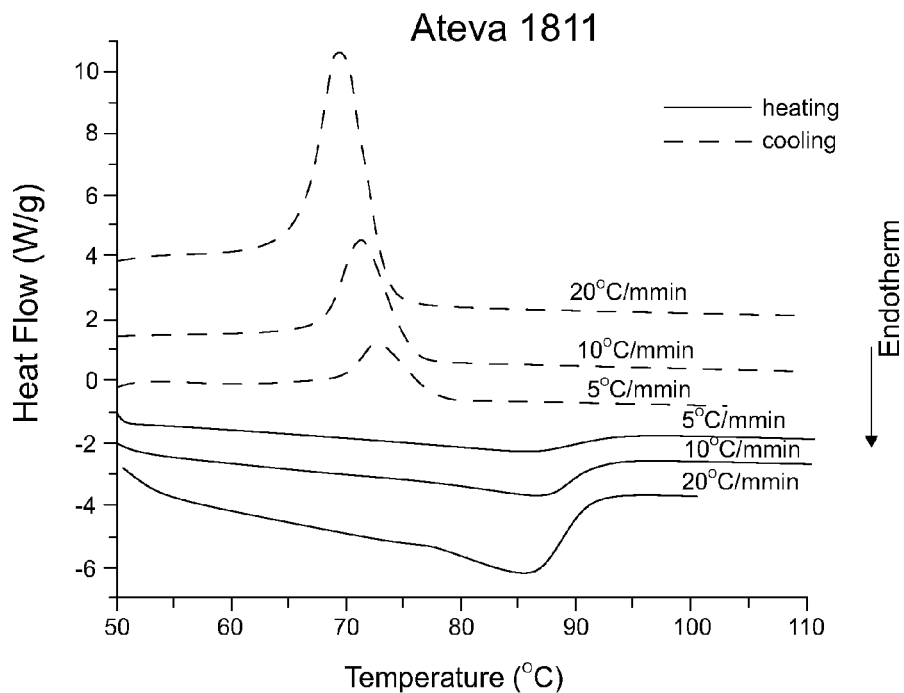
FIGS. 16A-D provide plots of heat flow versus temperature for various film compositions.
Figure 16B:
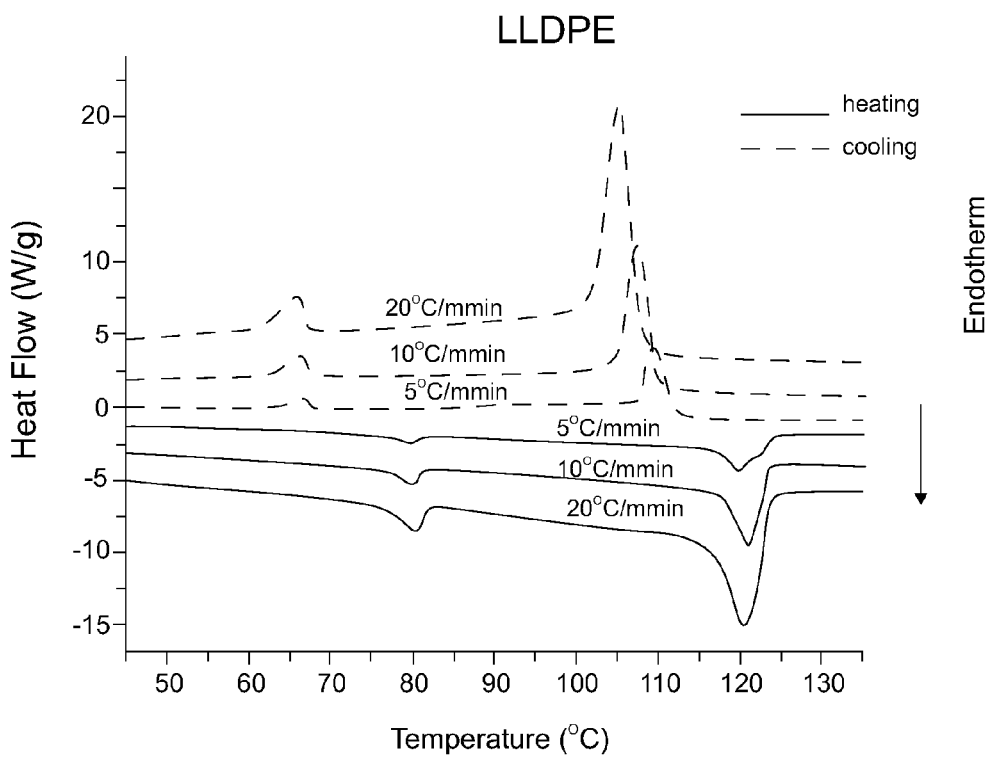
Figure 16C:
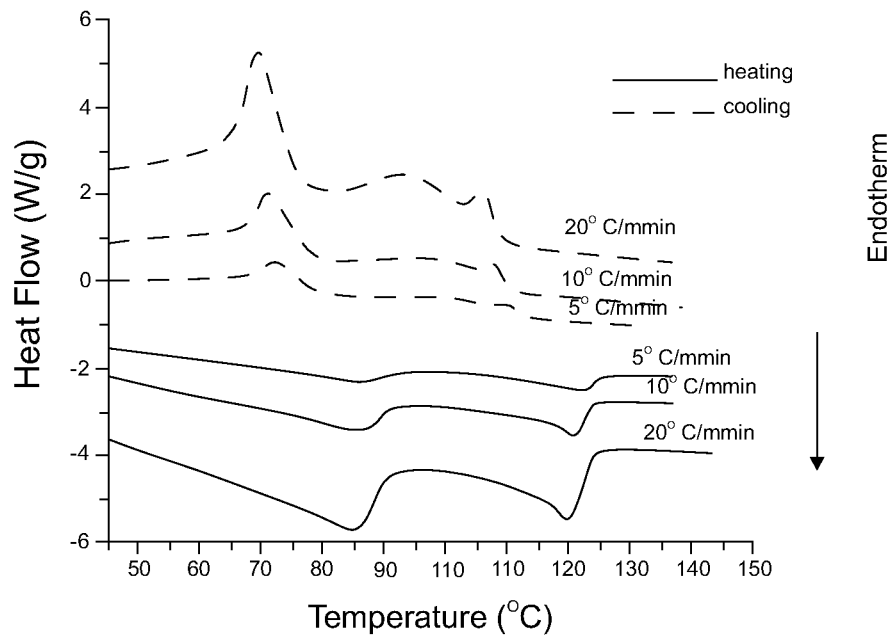
Figure 16D:
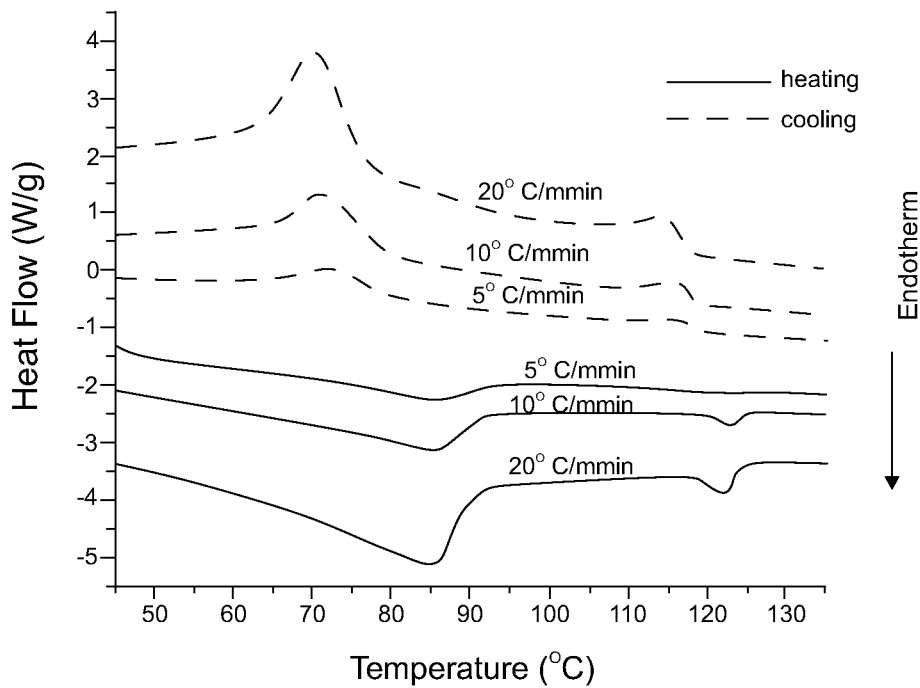

Differential Scanning calorimetry (DSC) method was employed to estimate thermal conductivity of the sealant containing OC and CC. Pellets of different sealant blends were extruded and injection molded into test bars. A small sample at an approximate size of 4 mg was cut from the test bar, and encapsulated in standard DSC pans. DSC was performed with TA Instruments Q100 equipment. Prior to the test, a heating cycle of 10° C./min was performed to erase the thermal history of the blend. The test was performed in three subsequent cycles of heat-cool-heat experiments between 30° C. to 160° C., with various heating and cooling rates. The first cycle was run at a rate of 5° C./min, the second cycle at 10° C./min and the third cycle rate at 20° C./min. As shown in FIG. 16A, the DSC scans contain signals from EVA that has one crystalline region and LLDPE displays two crystalline regions, exhibited as exothermic peaks. Both EVA/LLDPE/OC and EVA/LLDPE/OC+CC+ Talc samples exhibit two crystalline regions: a big and broad melting peak around 80° C. that correlates to EVA and LLDPE co-monomer, and a smaller and sharper peak at around 120° C. corresponding to LLDPE. Thermal conductivity from this measurement was reported.

Thermal conductivity is the quantity of heat transmitted, due to unit temperature gradient, in unit conditions in a direction normal to a surface of unit area. It is measured as heat flow rate (watt) over distance (meter) and temperature gradient (Kelvin), and reported in unit of watt/(meter*Kelvin), simplified as k (W/m*K). Table 1 listed the thermal conductivity on films with sealant containing, LLDPE only, OC only, CC only and different combinations of OC/CC/Talc. The sealant formulations with only LLDPE, only OC or only CC had thermal conductivity in the range from 0.34 to 0.40 W/m*K. When OC, Talc and CC are present in the sealant formulation, the thermal conductivity increased significantly to a range of 1.2 to 1.5 W/m*K. This accounts for about more than 100% improvement. It clearly demonstrated that the combination of OC, Talc with CC delivers a synergistic effect, and thus much higher thermal conductivity enhancement than any individual filler or other combination of dual fillers. In addition, the right formulation of these fillers can increase the synergistic effect and offer much more improvement on thermal conductivity, as illustrated by film 15 and film 16.

TABLE 5

Thermal conductivity measured by DSC

|  | k/(W/m*K) |
|---|---|
| LLDPE only | 0.40 |
| OC only | 0.40 |
| CC only | 0.34 |
| Film OC + CC | 0.78-0.8 |
| Film 15 OC + CC + Talc | 1.5 |
| Film 16 OC + CC + Talc | 1.2 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A packaging system having a peelable seal section, the peelable seal section including a first sealing layer and a second sealing layer such that the first sealing layer contacts the second sealing layer to form a peelable seal, the first sealing layer including:

a thermoplastic polymer including a polymer component selected from the group consisting of nylons and polyolefins, wherein the polyolefins are from the group consisting of polypropylene, polyethylene, ethylene vinyl acetate, and copolymers thereof;

an organoclay dispersed within the thermoplastic polymer;

calcium carbonate dispersed within the thermoplastic polymer; and the organoclay being present in an amount from 5 weight % to 12 weight % of the combined weight of the thermoplastic polymer and the organoclay and the calcium carbonate, and the calcium carbonate being present in an amount from 5 weight % to 12 weight % of the combined weight of the thermoplastic polymer and the organoclay and the calcium carbonate, the peelable seal having a peel force between 0.5 lbs and 6 lbs per inch of sealing width.

2. The packaging system of claim 1 further comprising an amount of talc from 1 to 35 weight % of the combined weight of the thermoplastic polymer, the organoclay, and the calcium carbonate.

3. The packaging system of claim 1 wherein the first sealing layer is disposed over a metallic foil or film.

4. The packaging system of claim 1 wherein the first sealing layer is disposed over a paper board.

5. The packaging system of claim 1 wherein the first sealing layer is an oriented film.

6. The packaging system of claim 5 wherein the first sealing layer is biaxially oriented or oriented along a machine direction.

7. The packaging system of claim 5 wherein the first sealing layer is an oriented polypropylene or an oriented nylon.

8. The packaging system of claim 1 wherein the thermal conductivity is from about 0.40 W/m*K to about 10 W/*K.

9. The packaging system of claim 1 wherein the calcium carbonate comprises a plurality of particles having an average diameter of 0.1 microns to 20 microns.

10. The packaging system of claim 1 wherein the peelable seal section has a caulking slope that is less than about 0.0032.

11. The packaging system of claim 1 wherein the peelable seal section has a caulking slope from about 0.0026 to about 0.0032.

12. The packaging system of claim 1 wherein the peelable seal section has an ultimate perfect seal thickness between 5 to 300 microns.

13. The packaging system of claim 1 wherein the peelable seal is formable at all temperatures within a peelable seal temperature range, the peelable seal temperature range being from a seal initiation temperature to a temperature that is at least 100° F. above the seal initiation temperature.

14. The packaging system of claim 13 wherein the seal initiation temperature is from about 170° F. to about 420° F.

15. The packaging system of claim 1 wherein the organoclay comprises a plurality of particles having at least one spatial dimension less than 200 nm.

16. The packaging system of claim 1 wherein the organoclay comprises platelets having an average separation of at least 20 angstroms and an average aspect ratio from about 50 to about 1000.

17. The packaging system of claim 1 wherein the organoclay comprises a clay selected from the group consisting of bentonite, kaolinite, montmorillonite-'smectite, hectorite, fluorohectorite, saponite, beidellite, nontronite, illite clays, and combinations thereof.

18. The packaging system of claim 1 wherein the thermoplastic polymer comprises a polymer component selected from the group consisting of copolymers of ethylene, copolymers of propylene, ethylene vinyl acetate, and mixtures thereof.

19. The packaging system of claim 1 wherein the thermoplastic polymer comprises a polymer component selected from the group consisting of polyethylene, polypropylene, and combinations thereof.

20. A packaging system having a peelable seal section, the peelable seal section including:

a sealing structure having formula 1:

$$L_{1'}/\ldots/L_{n'}/P \quad (1)$$

wherein P is a first sealing layer, $L_1$ through $L_n$, are layers within a support base upon which the sealing layer is disposed, n is an integer representing the number of layers in the support base;

a substrate such that the first sealing layer contacts the substrate to form a peelable seal, the first sealing layer includes:

a thermoplastic polymer including a polymer component selected from nylons and polyolefins, wherein the polyolefins are from the group consisting of polypropylene, polyethylene, ethylene vinyl acetate, and copolymers thereof;

an organoclay dispersed within the thermoplastic polymer;

calcium carbonate dispersed within the thermoplastic polymer; and the organoclay being present in an amount from 5 weight % to 12 weight % of the combined weight of the thermoplastic polymer and the organoclay and the calcium carbonate, and the calcium carbonate being present in an amount from 5 weight % to 12 weight % of the combined weight of the thermoplastic polymer and the organoclay and the calcium carbonate, the peelable seal having a peel force between 0.5 lbs and 6 lbs per inch of sealing width.

21. The packaging system of claim 20 wherein n is an integer from 1 to 10.

22. The packaging system of claim 20 wherein the calcium carbonate comprises a plurality of particles having an average diameter of 0.1 microns to 20 microns.

23. The packaging system of claim 20 wherein the peelable seal has a caulking slope from about 0.0026 to about 0.0032.

24. The packaging system of claim 20 wherein the combined weight of the organoclay and the calcium carbonate is from about 10 weight % to about 35 weight % of the combined weight of the thermoplastic polymer, the organoclay, and the calcium carbonate and the peelable seal having a peel force between 0.5 lbs and 6 lbs per inch of sealing width.

25. The packaging system of claim 20 further comprising an amount of talc from 1 to 35 weight % of the combined weight of the thermoplastic polymer, the organoclay, and the calcium carbonate.

26. A packaging system having a peelable seal section, the peelable seal section including:

a sealing structure having formula 2:

$$L_{1'}/\ldots/L_{n'}/P/L_f \quad (2)$$

wherein P is a first sealing layer, $L_1$ through $L_n$ represent layers within a support base upon which the sealing layer is disposed, $L_f$ is an additional layer disposed over the first sealing layer, and n is an integer representing the number of layers in the support base;

a substrate such that the first sealing layer is disposed over the substrate to form a peelable seal, the first sealing layer including:

a thermoplastic polymer including a polymer component selected from nylons and polyolefins, wherein the polyolefins are from the group consisting of polypropylene, polyethylene, ethylene vinyl acetate, and copolymers thereof;

an organoclay dispersed within the thermoplastic polymer;

calcium carbonate dispersed within the thermoplastic polymer; and the organoclay being present in an amount from 5 weight % to 12 weight % of the combined weight of the thermoplastic polymer and the organoclay and the calcium carbonate, and the calcium carbonate being present in an amount from 5 weight % to 12 weight % of the combined weight of the thermoplastic polymer and the organoclay and the calcium carbonate, the peelable seal having a peel force between 0.5 lbs and 6 lbs per inch of sealing width.

27. The packaging system of claim 26 wherein n is an integer from 1 to 10.

28. The packaging system of claim 1 wherein a combination of organoclay and the calcium carbonate requires less organoclay to produce the peelable seal than organoclay without the calcium carbonate.

29. The packaging system of claim 1 wherein calcium carbonate to organic clay ratio is from 0.4 to 2.5.

30. The packaging system of claim 1 wherein the first sealing layer has a thermal conductivity that is higher than 0.60 w/m*K and less than 10 w/m*K at temperatures from 30° C. to 160° C.

31. The packaging system of claim 1 wherein the first sealing layer has a caulking slope from about 0.0025 to about 0.003.

32. The packaging system of claim 1 wherein the first sealing layer has an ultimate seal thickness from 260 microns to 400 microns.

33. A packaging system having a peelable seal section, the peelable seal section including a first sealing layer and a second sealing layer such that the first sealing layer contacts the second sealing layer to form a peelable seal, the first sealing layer including:

a thermoplastic polymer including a polymer component selected from nylons and polyolefins, wherein the polyolefins are from the group consisting of polypropylene, polyethylene, ethylene vinyl acetate, and copolymers thereof;

an organoclay dispersed within the thermoplastic polymer, the organoclay including a plurality of particles having at least one spatial dimension less than 200 nm, the organoclay including agglomerations of organoclay stacks;

calcium carbonate dispersed within the thermoplastic polymer; and the organoclay being present in an amount from 5 weight % to 12 weight % of the combined weight of the thermoplastic polymer and the organoclay and the calcium carbonate, and the calcium carbonate being present in an amount from 5 weight % to 12 weight % of the combined weight of the thermoplastic polymer and the organoclay and the calcium carbonate, the peelable seal having a peel force between 0.5 lbs and 6 lbs per inch of sealing width.

* * * * *